United States Patent
Sun et al.

(10) Patent No.: US 12,496,735 B2
(45) Date of Patent: Dec. 16, 2025

(54) MULTIPLE OBJECT GRASPING USING ROBOTICS

(71) Applicant: UNIVERSITY OF SOUTH FLORIDA, Tampa, FL (US)

(72) Inventors: Yu Sun, Tampa, FL (US); Adheesh Shenoy, Tampa, FL (US); Tianze Chen, Tampa, FL (US); Francis Tsow, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 155 days.

(21) Appl. No.: 18/352,843

(22) Filed: Jul. 14, 2023

(65) Prior Publication Data

US 2024/0017426 A1    Jan. 18, 2024

Related U.S. Application Data

(60) Provisional application No. 63/389,245, filed on Jul. 14, 2022.

(51) Int. Cl.
*B25J 9/16*  (2006.01)
*B25J 15/10* (2006.01)

(52) U.S. Cl.
CPC ............. *B25J 15/10* (2013.01); *B25J 9/1664* (2013.01)

(58) Field of Classification Search
CPC .... B25J 9/1664; B25J 15/0009; B25J 9/1612; B25J 15/10; G05B 2219/39496; G05B 2219/40625; G05B 2219/40053
See application file for complete search history.

(56) References Cited

U.S. PATENT DOCUMENTS

| | | | |
|---|---|---|---|
| 9,486,927 B1 * | 11/2016 | Morey | B25J 15/0061 |
| 10,792,810 B1 | 10/2020 | Beckman et al. | |
| 12,115,667 B2 * | 10/2024 | Guo | B25J 9/1653 |
| 2020/0061811 A1 | 2/2020 | Iqbal et al. | |
| 2020/0164517 A1 | 5/2020 | Dick et al. | |
| 2020/0319627 A1 * | 10/2020 | Edwards | G05B 19/41885 |

(Continued)

FOREIGN PATENT DOCUMENTS

| | | |
|---|---|---|
| CN | 113829358 A | 12/2021 |
| WO | 2021080881 A1 | 4/2021 |

OTHER PUBLICATIONS

Boularias; "Learning Robot Grasping from 3-D Images with Markov Random Fields"; 2011 IEEE/RSJ International Conference on Intelligent Robots and Systems; 2011; 1548-1553 (Year: 2011).*

(Continued)

*Primary Examiner* — Stephen Holwerda
(74) *Attorney, Agent, or Firm* — HUSCH BLACKWELL LLP

(57) ABSTRACT

Systems and methods for multiple object transferring using robotics. A system includes a robotic hand with a base and fingers capable of grasping objects. A robotic arm is coupled to the robotic hand and is capable of moving the robotic hand. One or more circuits are configured to operate the robotic hand and the robotic arm by identifying a pre-grasp configuration for the robotic hand and executing a transfer routine based on a Markov decision process model to operate the robotic hand and the robotic arm such that they move multiple objects from a first location to a second location.

17 Claims, 28 Drawing Sheets

(56) References Cited

U.S. PATENT DOCUMENTS

2020/0398427 A1\* 12/2020 Kupcsik .................. B25J 9/163
2021/0125052 A1\* 4/2021 Tremblay ............... G06N 3/084

OTHER PUBLICATIONS

Pajarinen, J., & Kyrki, V. (2017). Robotic manipulation of multiple objects as a POMDP. Artificial Intelligence, 247, pp. 213-228.
Lobbezoo, A., Qian, Y., & Kwon, H. J. (2021). Reinforcement learning for pick and place operations in robotics: A survey. Robotics, 10(3), 105, pp. 1-27.

\* cited by examiner

| Sphere (40mm) | Sphere (45mm) | Cylinder (Medium) | Cylinder (Medium) | Cube (Large) | Cube (Small) |
|---|---|---|---|---|---|
| 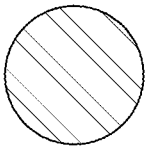 | 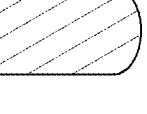 | 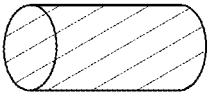 |  | 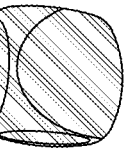 | 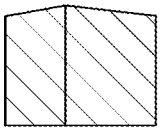 |
| Plum | Golf Ball | Egg | Strawberry | Pear | Dice |
| 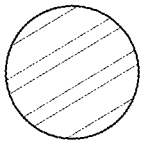 | 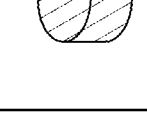 | 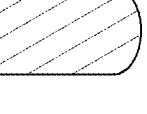 |  | 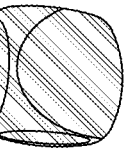 |  |
FIG. 7E

| Number of Spheres | Best-Expectation Pre-Grasp | Maximum Capability Pre-Grasp |
|---|---|---|
| 0 | 6% | 80% |
| 1 | 16% | 10% |
| 2 | 16% | 10% |
| 3 | 42% | 0% |
| 4 | 20% | 0% |

FIG. 8

| Estimation Model | Precision (Simulation) | Precision (Real) | Root Mean Square Error (Simulation) | Root Mean Square Error (Real) |
|---|---|---|---|---|
| non-zero | 95.1% | 96.09% | NA | NA |
| 1 | 85.97% | 51.72% | 0.6 | 0.69 |
| 2 | 67.18% | 51.46% | 0.97 | 0.87 |
| 3 | 40.95% | 38.24% | 1.84 | 0.92 |
| ≥2 | 78.97% | 83.04% | NA | NA |

FIG. 9

| Approach | Grasping Routine | Average Transfers | Average Lifts |
|---|---|---|---|
| Naïve | SFR (Real) | 4.7 | 5.4 |
| MDP-MOGT | SFR (Real) | 4.4 | 4.9 |
| Naïve | Estimation Models (Real) | 4.2 | 4.9 |
| MDP-MOGT | Estimation Models (Real) | 4.1 | 4.2 |
| MDP-MOGT | SFR (Simulation) | 6.0 | 7.6 |
| MDP-MOGT | Estimation Models (Simulation) | 5.9 | 6.8 |

FIG. 10

| Transfer Approach | System | Average Transfers | Average Lifts |
|---|---|---|---|
| Naïve | Real | 4.2 | 4.9 |
| Value Iteration | Real | 4.1 | 4.2 |
| Naïve | Simulation | 4.4 | 5.6 |
| Value Iteration | Simulation | 4.8 | 5.6 |
| Q Learning | Simulation | 5.3 | 6.7 |
| Actor-Critic | Simulation | 4.6 | 5.7 |

FIG. 11

| Transfer Approach | Average Transfers | Average Lifts |
|---|---|---|
| Naïve | 4.5 | 5.7 |
| Value Iteration | 4.8 | 5.1 |
| Q Learning | 5.4 | 7.9 |
| Actor-Critic | 4.6 | 4.9 |

FIG. 12

| Estimated Object Number | 40mm Sphere | 50mm Sphere | Ping-Pong Ball (Real) |
|---|---|---|---|
| non-zero | 94.92% | 84.75% | 94.25% |
| 2 | 61.46% | 35.19% | 43.14% |
| 3 | 32.57% | 11.11% | 36.14% |

FIG. 13

| Target Number | Stochastic F/E (Before PPG) | Stochastic F/E (After PPG) | Stochastic Grasping Strategy | Averaged Re-Grasps | Averaged Objects Per Grasp |
|---|---|---|---|---|---|
| 2 40mm Spheres | 0.436 | 0.387 | 0.346 | 2.3 | 1.5 |
| 3 40mm Spheres | 0.742 | 0.686 | 0.557 | 0.7 | 2.0 |
| 2 50mm Spheres | 0.4 | 0.346 | 0.2 | 3.9 | 1.6 |
| 3 50mm Spheres | 0.592 | 0.624 | 0.52 | 4 | 1.0 |
| 2 Mixed Spheres | 0.374 | 0.53 | 0.316 | 1.4 | 1.1 |
| 3 Mixed Spheres | 0.624 | 0.5 | 0.5 | 0.5 | 1.9 |

FIG. 14

| Target Number | Stochastic F/E (Before PPG) | Stochastic F/E (After PPG) | Stochastic Grasping Strategy | Averaged Re-Grasps |
|---|---|---|---|---|
| 2 Balls | 0.332 | 0.283 | 0.265 | 0.2 |
| 3 Balls | 0.608 | 0.5 | 0.4 | 0.3 |

FIG. 15

| Methods | Object Type | Target Number | OPO RMSE | CGPU full-lift | CGPU mini-lift | CGPU re-grasp |
|---|---|---|---|---|---|---|
| Baseline | - | - | 0 | 1 | 0 | 0 |
| Proposed | 40mm sphere | 2 | 0.7746 | 0.8197 | 0.9738 | 1.12 |
| | | 3 | 0.9798 | 0.63 | 0.8182 | 1.31 |
| | | 5 | - | 0.7673 | 0.8205 | 1.13 |
| | | 10 | - | 0.4737 | 0.5057 | 0.61 |
| | Medium Cylinder | 2 | 0.8646 | 0.86 | 1.116 | 1.22 |
| | | 3 | 1.3253 | 0.67 | 0.9585 | 1.36 |
| | | 5 | - | 0.7426 | 0.88 | 1.11 |
| | | 10 | - | 0.4915 | 0.52 | 0.65 |
| | Plum | 2 | 1.1326 | 1.06 | 1.1819 | 0.985 |
| | | 3 | 1.7224 | 0.88 | 0.9323 | 0.82 |

FIG. 16

|  | Synergy + CNN | Synergy + CNN & Mini-lift | Synergy + Transformer & Mini-lift | Synergy + Transformer & Mini-lift & ET |
|---|---|---|---|---|
| Accuracy Grasping 2 | 51% | 55% | 61% | 63% |
| RMSE Grasping 2 | 0.9395 | 0.9527 | 0.7746 | 0.7876 |
| Accuracy Grasping 3 | 46% | 45% | 53% | 55% |
| RMSE Grasping 3 | 1.1252 | 1.071 | 0.9798 | 0.972 |

FIG. 17

MULTIPLE OBJECT GRASPING USING ROBOTICS

CROSS-REFERENCE TO RELATED APPLICATION

This application claims the benefit of and priority to U.S. Provisional Patent Application No. 63/389,245, filed Jul. 14, 2022, the entirety of which is incorporated by reference herein.

STATEMENT REGARDING FEDERALLY SPONSORED RESEARCH

This invention was made in part with government support under Grant Numbers 1812933 and 191004 awarded by the National Science Foundation. The government has certain rights in the invention.

TECHNICAL FIELD

The technology described below relates generally to improved methods for operating robotic systems. The robotic systems can be used to perform tasks such as transferring objects between different locations. For example, a robotic arm and a robotic hand may be used to transfer objects from a first bin to a second bin.

BACKGROUND

Robotic systems can be used to transfer objects from one location to another location. However, many existing robotic systems simply grasp one object at a time and transfer that single object to the desired location. In contrast, when humans perform similar tasks, they typically grasp multiple objects at a time and transfer them together for better efficiency. Systems and methods for robotics involving more efficient transfer of objects are generally desired.

SUMMARY

The disclosure provides in one aspect a system including a robotic hand, a robotic arm, and one or more circuits for operating the robotic hand and the robotic arm. The robotic hand includes a base and fingers and is capable of grasping objects. The robotic arm is coupled to the robotic hand and is capable of moving the robotic hand. The one or more circuits are configured to identify a pre-grasp configuration for the robotic hand based on a target quantity of the objects to be grasped by the robotic hand; operate the fingers of the robotic hand in accordance with the pre-grasp configuration; and execute a transfer routine based on a Markov decision process to operate the robotic arm and the robotic hand such that the robotic hand grasps the target quantity of objects in a first location and the robotic hand and the robotic arm transfer the target quantity of objects to a second location.

In another aspect, the disclosure provides a method. The method includes identifying a pre-grasp configuration for a robotic hand that includes fingers based on a target quantity of objects to be grasped by the robotic hand; operating the fingers of the robotic hand in accordance with a spread angle of one or more of the fingers of the robotic associated with the pre-grasp configuration; and executing a transfer routine based on a Markov decision process to operate a robotic arm coupled to the robotic hand such that the robotic hand grasps the target quantity of objects in a first location and transfers the target quantity of objects to a second location.

In another aspect, the disclosure provides another method. The method includes identifying a pre-grasp configuration for a robotic hand that includes fingers based on a target quantity of objects of a collection of objects to be grasped by the robotic hand; identifying an end-grasp configuration for the robotic hand based on the target quantity of objects to be grasped by the robotic hand; operating the fingers of the robotic hand in accordance with the pre-grasp configuration; operating a robotic arm coupled to the robotic hand to move the robotic hand near the collection of objects; operating the fingers of the robotic hand in accordance with the end-grasp configuration such that the robotic hand grasps the target quantity of objects; and executing a transfer routine based on a Markov decision process to operate the robotic arm and the robotic hand such that the robotic arm and the robotic hand transfer the target quantity of objects from a first location to a second location.

BRIEF DESCRIPTION OF THE DRAWINGS

FIG. 7E is a table showing different example objects that can be grasped by the control system of FIG. 1, according to some aspects of the disclosure.

FIG. 8 is a table showing example pre-grasp data associated with multiple object grasping using robotics, according to some aspects of the disclosure.

FIG. 9 is a table showing example estimation model data associated with multiple object grasping using robotics, according to some aspects of the disclosure.

FIG. 10 is a table showing example transfer and lift data associated with multiple object grasping using robotics, according to some aspects of the disclosure.

FIG. 11 is another table showing example transfer and lift data associated with multiple object grasping using robotics, according to some aspects of the disclosure.

FIG. 12 is yet another table showing example transfer and lift data associated with multiple object grasping using robotics, according to some aspects of the disclosure.

FIG. 13 is a table showing example estimated object data associated with multiple object grasping using robotics, according to some aspects of the disclosure.

FIG. 14 is a table showing example grasping data associated with multiple object grasping using robotics, according to some aspects of the disclosure.

FIG. 15 is another table showing example grasping data associated with multiple object grasping using robotics, according to some aspects of the disclosure.

FIG. 16 is a table showing example metrics associated with different functionality that can be implemented using the control system of FIG. 1, according to some aspects of the disclosure.

FIG. 17 is another table showing example metrics associated with different functionality that can be implemented using the control system of FIG. 1, according to some aspects of the disclosure.

DETAILED DESCRIPTION

Figure 1:
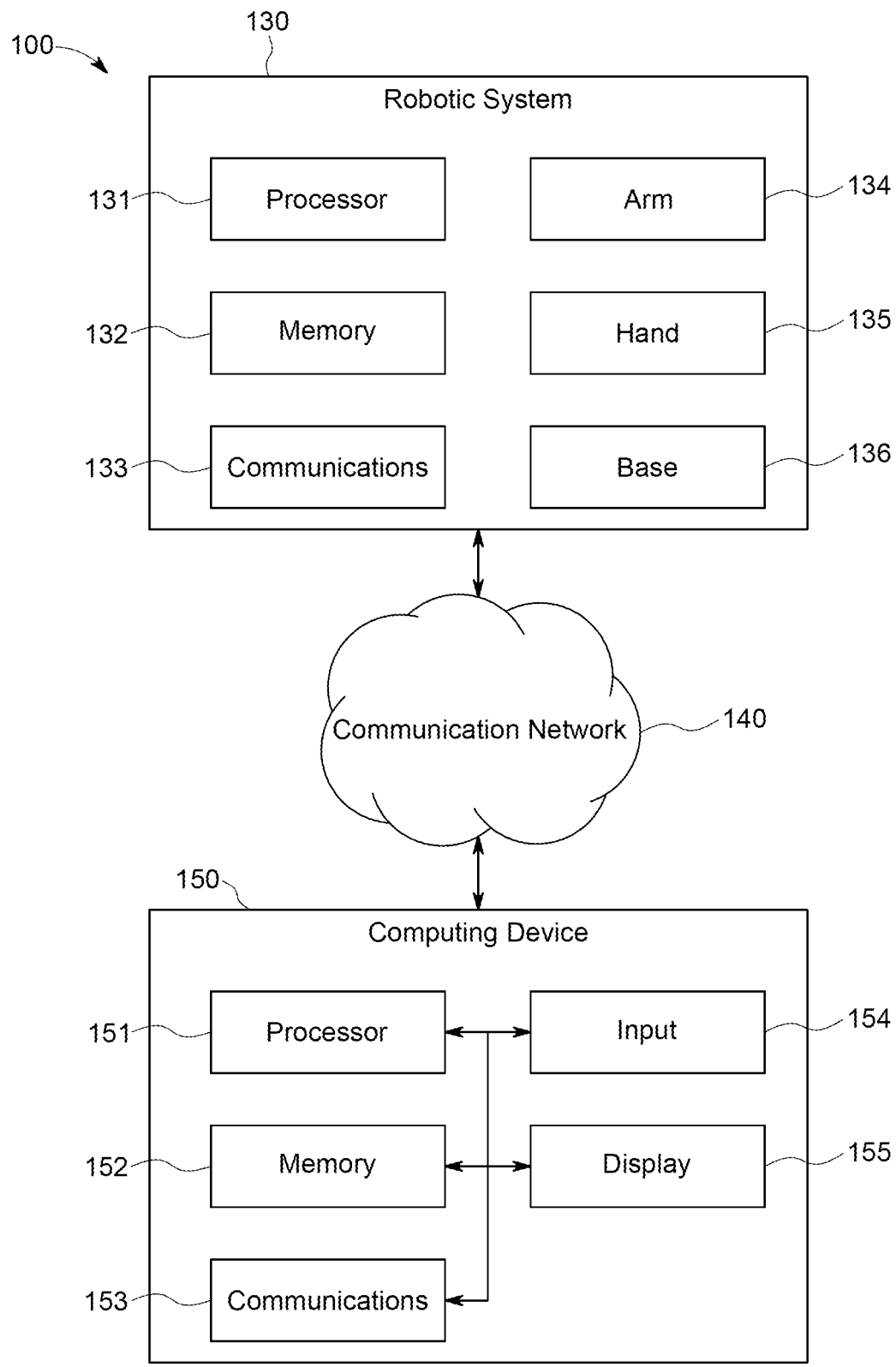
FIG. 1 is a block diagram of an example control system, according to some aspects of the disclosure.

The ability to transfer objects from one location to another can be considered a menial task for humans. The sense of touch and experience allows humans to simply grasp multiple objects from a pile and move them to another location (e.g., into a bin). Humans face these kind of tasks in a variety of situations, such as during cooking when multiple cloves of garlic may be grasped and transferred into a pot according to a recipe. As another example relating to logistics, humans may be expected to transfer objects such as bulbs from a pile to fill 10-pack or bins. To complete these tasks, humans grasp several objects at a time and transfer them together because it is more efficient than grasping and transferring the objects one at a time.

In the field of robotics, the ability to develop systems that can perform multiple object grasping (MOG) or multiple object bin-picking can provide advantages in a variety of different applications. Some robotics systems focus on single object bin-picking, pick-and-place, and grasping for manipulations. In more traditional single object picking or grasping, the pose of an object may be estimated using a vision system to guide a robotic hand or gripper. Since humans have demonstrated outstanding grasping skills, several approaches attempt to extract human grasping strategies and use them to reduce the complexity of grasp planning. Learning-based approaches can use large labeled datasets and deep neural networks to directly find good grasp points from dense three-dimensional point clouds.

However, work on grasping multiple objects has been limited. Some approaches focus on static grasp stability analysis, such as the enveloping grasp of multiple objects under rolling contacts and force closure of multiple objects. Some approaches involve active force closure analysis for the manipulation of objects, to achieve stability when grasping multiple objects through force-closure-based strategies. In these approaches, target objects often are already in the air and traditional grasp quality measures are used to analyze the grasps. Deep learning approaches can be used for the tactile sensing aspect of multiple object grasping to estimate the object quantity in a grasp.

Several technical challenges are present with respect to multiple object grasping. For one, estimating the object quantity and the pose of the objects in a bin is challenging. Occlusion among objects of similar color and texture makes computer-based vision approaches prone to error. Additionally, the displacement of objects within the bin in contact with the hand will typically void previously estimated poses of the objects in the bin. When the hand contacts the object pile in the bin, it displaces the surrounding objects. If only a computer vision system is relied upon, the eye of the hand-eye system can no longer view most of the hand once the hand enters the bin or an object is grasped. This phenomenon can lead to a variety of instances where the eye can no longer update the estimated pose of the objects to be grasped.

Robots can use tactile sensors and torque sensors when grasping objects (e.g., from a bin). Tactile sensing is as a critical perception component in object grasping and manipulation. Tactile sensing approaches can be used with vision sensors to estimate the location of an object relative to a world coordinate system, for example. Tactile sensing approaches can also be implemented using embedded force sensors on a robotic hand and a 6-axis force/torque sensor on the wrist of a robot, for example. In such approaches, tactile/force sensors can be used to reduce the uncertainty in the perception of the vision system, or are used only for single object grasping. For picking the target quantity, the robot in these cases would need to predict how many objects will remain in grasp after lifting the hand from the bin. The robot here needs to make a prediction before lifting the hand so that it can adjust or simply try again without lifting the hand if the predicted quantity is different from the desired one.

When attempting to grasp multiple objects with a robotic hand, the squeezing force of the robotic hand will alter the layout of randomly piled objects that are not attached to each other. The grasping action of the robotic hand can randomly alter the orientation of objects in a way that is difficult to predict. In a sense, the random scattering of objects in this manner is as chaotic as Brownian motions locally. Accordingly, it is difficult to model this phenomenon in a way that accounts for every single object that is involved. However, procedures involving probabilistic models, such as grasping using stochastic process models, can be implemented in accordance with some aspects of the disclosure.

When the target quantity is small, multiple object grasping once may be sufficient to complete the task. However, if the target quantity is large, one grasp and transfer would not be sufficient to complete the task. Accordingly, an approach that can produce a large quantity multiple object grasping policy to ensure both the precision of the total outcome of several multiple object grasp and transfers and the efficiency of the combined multiple object grasp and transfers.

Procedures for transferring a targeted quantity of objects from a pile into a bin using multiple object grasping can be implemented in accordance with some aspects of the disclosure. Various techniques for multiple object grasping, including pre-grasp selection, end-grasp selection, maximum capability grasp selection, and in-grasp object quantity estimation can also be implemented in accordance with some aspects of the disclosure. Compared to single object transferring, approaches described herein can reduce the number of transfers between bins and reduce the number of lifts from the bin. Assuming a 100% success rate of a comparative single object grasping algorithm, the multiple object grasping approaches described herein can reduce the number of transfers between locations and/or the number of lifts from a particular location. For example, as described below, in some implementations the multiple object grasping approaches described herein can reduce the number of transfers by around 59%, and reduce the number of lifts from a bin by around 58%.

Referring to FIG. 1, an example control system 100 is shown, in accordance with some aspects of the disclosure. Control system 100 is shown to include a robotic system 130, a communication network 140, and a computing device 150. Control system 100 can be used to configure a robot to perform a multiple object grasping process such that the robot transfers multiple objects between locations at a time. Communication network 140 can be any suitable communications network or combination of communication networks. For example, communication network 140 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some aspects, communication network 140 can be a local area network, a wide area network, a public network (e.g., the Internet), a private or semi-private network (e.g., a corporate or university intranet), any other suitable type of network, or any suitable combination of networks. Communications links for connecting to communication network 140 can be formed using any suitable communications link or combination of communications links, such as wired links, fiber optic links, Wi-Fi links, Bluetooth links, cellular links, etc. Communication network 140 can facilitate communication between computing device 150 and robotic system 130. The components of control system 100 illustrated in FIG. 1 are provided as an example, and it will be appreciated that similar systems can include more, fewer, and/or different elements from what is shown and described. It will be appreciated that decisions made with respect to operating the robotic components of robotic system 130 can be made by robotic system 130, by computing device 150, or by a combination thereof.

Robotic system 130 is shown to include a processor 131, a memory 132, a communications interface 133, an arm 134, a hand 135, and a base 136. Processor 131 can be any suitable processor or processing device, or a combination of any suitable processor or processing device, including a central processing unit (CPU), graphics processing unit (GPU), and other types of processors capable of executing instructions. Memory 132 can include any suitable storage device or devices that can be used to store instructions, values, etc., that can be used, for example, by processor 131. Memory 132 can include any suitable volatile memory, non-volatile memory, storage, or any suitable combination thereof. For example, memory 132 can include RAM, ROM, EEPROM, one or more flash drives, one or more hard disks, one or more solid state drives, one or more optical drives, etc. Communications interface 133 can include any suitable hardware, firmware, and/or software for communicating with the systems, over any suitable communication networks. For example, the communications interface 133 can include one or more transceivers, one or more communication chips and/or chip sets, etc. Communications interface 133 can include hardware, firmware, and/or software that can be used to establish a coaxial connection, a fiber optic connection, an Ethernet connection, a USB connection, a Wi-Fi connection, a Bluetooth connection, a cellular connection, etc. Communications interface 133 can provide a connection between robotic system 130 and communication network 140, for example.

Collectively, arm 134, hand 135, and base 136 form a robot capable of moving objects between locations. Base 136 can be any suitable type of base that arm 134 is coupled to. Base 136 provides stability to anchor and support arm 134 and hand 136. In some aspects, base 136 can house electronic components such as processor 131, memory 132, communications interface 133, a power supply, wiring, and the like. Arm 134 can be connected to both hand 135 and base 136, and can be any suitable type of robotic arm capable of pivoting and moving hand 135. For example, arm 134 can be a UR5e robotic arm, among other similar types of robotic arms. Arm 134 can be various lengths, with various quantities and types of pivoting joints. Arm 134 can also include various types of sensors. Hand 135 likewise can be any suitable type of robotic hand capable of grasping objects. For example, hand 135 can be a Barret Hand, among other similar types of robotic hands. Hand 135 can include a palm and various types and quantities of fingers like fingers on a human hand. Note that fingers of hand 135 can be configured to have more or fewer degrees of freedom than a human finger, and/or can be configured to have a larger or narrower range of motion along one or more degrees of freedom. Hand 135 can include a variety of different types of sensors that generate data to facilitate operation of hand 135, and robotic system 130 as a whole.

Computing device 150 is shown to include a processor 151, a memory 152, a communications interface 153, an input 154, and a display 155. Processor 151 can be any suitable processor or processing device, or a combination of any suitable processor or processing device, including a central processing unit (CPU), graphics processing unit (GPU), and other types of processors capable of executing instructions. Memory 152 can include any suitable storage device or devices that can be used to store instructions, values, etc., that can be used, for example, by processor 151. Memory 152 can include any suitable volatile memory, non-volatile memory, storage, or any suitable combination thereof. For example, memory 152 can include RAM, ROM, EEPROM, one or more flash drives, one or more hard disks, one or more solid state drives, one or more optical drives, etc. Communications interface 153 can include any suitable hardware, firmware, and/or software for communicating with the systems, over any suitable communication networks. For example, the communications interface 153 can include one or more transceivers, one or more communication chips and/or chip sets, etc. Communications interface 153 can include hardware, firmware, and/or software that can be used to establish a coaxial connection, a fiber optic connection, an Ethernet connection, a USB connection, a Wi-Fi connection, a Bluetooth connection, a cellular connection, etc. Communications interface 153 can provide a connection between computing device 150 and communication network 140, for example. Computing device 150 can optionally include a display for presenting data and facilitating interactions with a human. Input 154 can be any suitable kind of input device or devices such as indicators, sensors, actuatable buttons, a keyboard, a mouse, a graphical user interface, a touch-screen display, etc. that can provide input to computing device 150. Computing device 150 generally can be a device such as a personal computer, workstation, smartphone, tablet, and the like. Computing device 150 can also be a server, such as either an on-premises server computer and/or a remote (cloud) server. Computing device 150 can generally be used to program robotic system 130 to perform functions.

Figure 2:
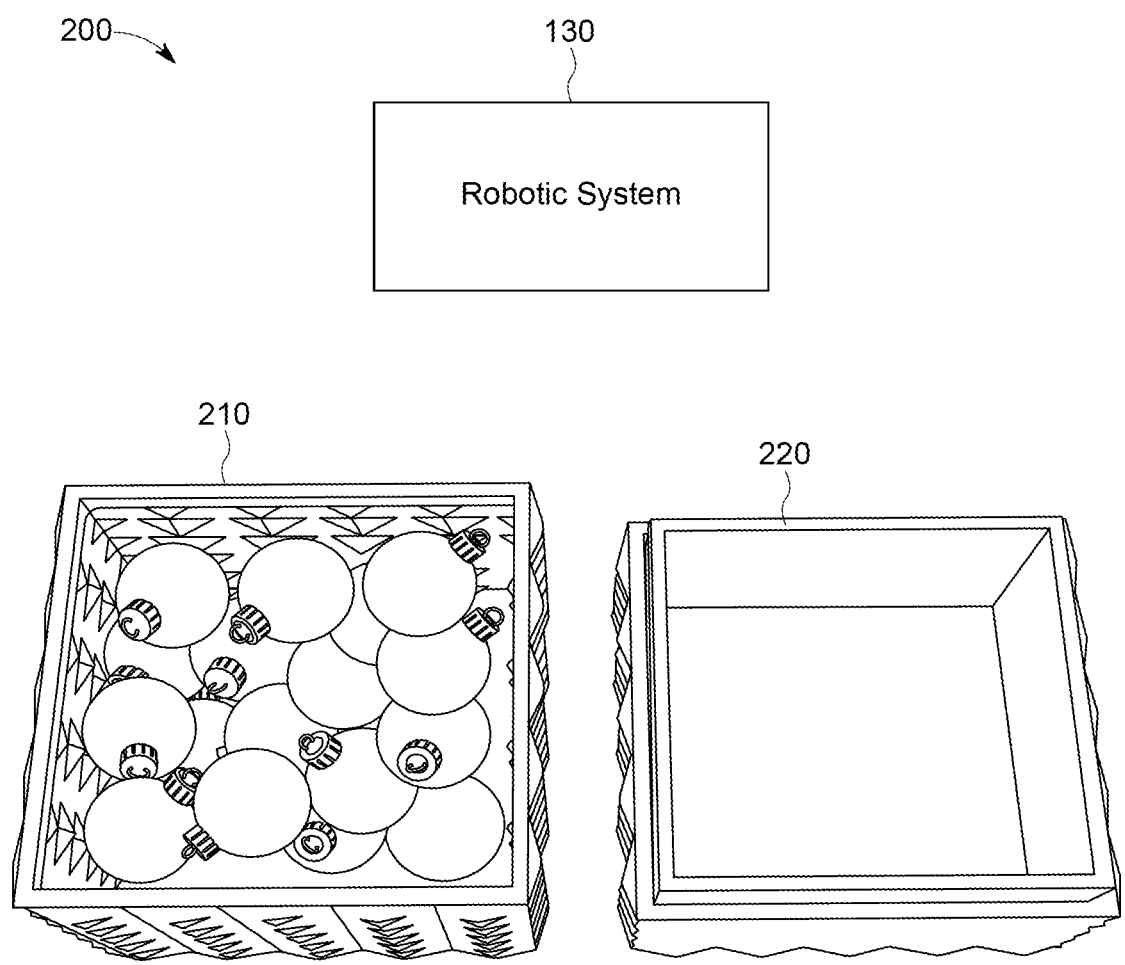
FIG. 2 is an illustration of an example system where multiple object grasping using robotics can be implemented, according to some aspects of the disclosure.

Referring to FIG. 2, an example system 200 where multiple object grasping using robotics can be implemented is shown, according to some aspects of the disclosure. System 100 is shown to include a first bin 210, a second bin 220, and robotic system 130. Bin 210 is shown to include 10 tomatoes which can be transferred from bin 210 to bin 220 by robotic system 130. As described above, robotic system 130 can include hand 135 with fingers, where hand 135 is connected to arm 134 and base 136, as well as one or more circuits for operating hand 135 and arm 134, among other components. Hand 135 is capable of grasping the tomatoes, and arm 134 is capable of moving the hand. In this example setup shown as system 200, the tomatoes are generally of uniform size and shape, and they are randomly piled up (placed) in bin 210. A pick-and-transfer process that moves the tomatoes from bin 210 to bin 220 can be completed in a variety of different ways. One approach is a basic single object grasping approach that involves picking and transferring one tomato at a time. If the quantity of tomatoes is N, this process is expected to involve at least N times of picking and transferring.

Another approach is a naïve multiple object grasping approach, where at first as many tomatoes as possible are grasped by the robot to quickly reach or get close to the desired target quantity. Then, after the first grasp, the remaining number of tomatoes are grasped. Consider that a robot can grasp and hold q objects at most, in this approach, the robot will first perform $$p = rounddown\left(\frac{m}{q}\right)$$

times of picking and placing q objects and then grasp the remaining r=N−p*q number of objects. For example, with the demanded quantity of 10 tomatoes and a robotic hand that can grasp 4 tomatoes at the most, the robot will grasp and transfer 4 tomatoes twice and then pick and transfer the remaining 2 tomatoes. However, in reality, even if a robotic hand can grasp up to 4 tomatoes, the robotic hand can rarely do so successfully and consistently. The robot may need several re-grasps (e.g., open and close the hand in the pile) to achieve a full grasp of the target quantity of objects. On the other hand, due to perception error, a robot may determine that it holds 4 tomatoes as it lifts its hand, but in reality the robot may have only grasped 1, 2, or even 0 objects. Accordingly, this naïve multi-object grasping approach may not be the most efficient approach.

In some aspects, mechanisms described herein can be used to model the picking and transferring process as a Markov decision process (MDP) to facilitate multi-object grasping, which can leverage a stochastic feature in grasping multiple objects. The states used in the Markov decision process can be the object quantity in the receiving bin (e.g., bin 220), and the actions can be grasping actions for a number of different objects. The actions can also be lifting and transferring actions. Since a grasping action may pick up different quantities with different probabilities, it can be modeled as a Markov decision process. In some aspects, mechanisms described herein can be refined with an optimization goal to reach the target quantity while minimizing the number of grasps and transfers between bins. The model can generate a policy that requires the robot to perform a grasp action for any number of objects at a particular step. This approach can be referred to as Markov-decision-process-based multiple object grasping and transferring, or MDP-MOGT for short.

Figure 3:
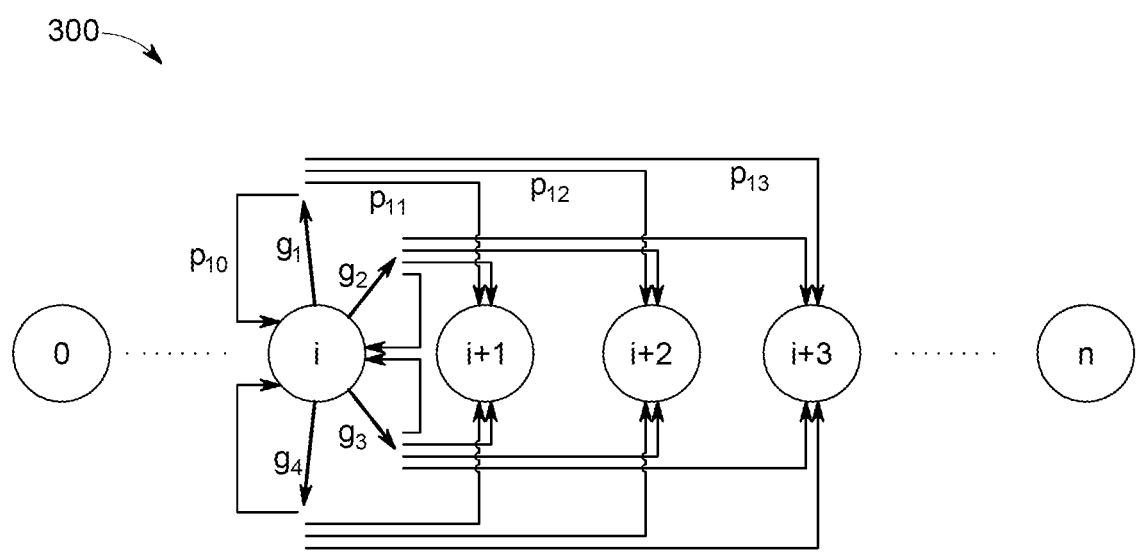
FIG. 3 is an illustration of an example Markov decision process that can be used for multiple object grasping using robotics, according to some aspects of the disclosure.

Referring to FIG. 3, an example Markov decision process 300 that can be used for multiple object grasping using robotics is shown, according to some aspects of the disclosure. Process 300 can be performed by robotic system 130, for example. In the model of process 300 illustrated in FIG. 3, a series of states are represented by the circles labeled i, i+1, i+2, i+3 . . . n where each state represents a number of objects in the receiving bin (e.g., bin 220). Different multiple object grasping actions are represented as arrows labeled $g_1$, $g_2$, $g_3$, and $g_4$. In the example where the maximum number of objects (e.g., the tomatoes in bin 210) that robotic system 130 can grasp at one time is 4 (q=4), each of the multiple object grasping actions shown in FIG. 3 represents a number of objects grasped by the robot. For example, $g_2$ represents a multiple object grasping action where 2 objects are grasped by the robotic system 130, and $g_3$ represents a multiple object grasping action where 3 objects are grasped by robotic system 130. Depending on the application, each multiple object grasping action i can end up having 0, 1, 2, . . . , or q objects in the grasp of the robot and transition to state i, i+1, i+2, i+3 . . . i+q with probabilities (also shown in FIG. 3) $p_{i0}$, $p_{i1}$, . . . , $p_{iq}$ respectively.

The current state in process 300 is the object quantity in the receiving bin. If the receiving bin has the target quantity, the goal state is reached. The start state is zero, representing an empty receiving bin. At a given step, robotic system 130 takes a multiple object grasping action and transfers objects to the receiving bin, if there are objects grasped. At the end of each step after robotic system 130 has taken an action, the state of robotic system 130 changes based on the number of objects transferred to the receiving bin during that step. In FIG. 3, the states are represented as 0 to n, where n is the target quantity. A reward is associated with the new state, where the reward can be defined as shown in the equation below, where $r(s'|(s,g_i))$ is the reward of taking action $g_i$ at state s resulting in the new state s'.

$$r(s' \mid (s, g_i)) = \begin{cases} -(n-s'), & \text{if } s' < n \\ 100,000 & \text{if } s' = n \\ -1000, & \text{if } s' > n \end{cases}$$

A multiple object grasp and transfer (MOGT) action can include sub-actions, such as: multiple object grasping, lifting, and transferring. Any sequence of finger flexion and extension on hand 135 can be considered a grasping action. However, some sequences can rarely pick up any objects at all, while other actions can grasp multiple objects with a high success rate (high probability of success). Accordingly, it is beneficial to explore the grasping action space and identify several grasps that are most suitable for multiple object grasping.

The grasp action space can be explored by using a stochastic flexing routine (SFR) to perform a bias random walk grasp from several pre-grasps. The set of pre-grasps can have a dense sample of feasible hand configurations achievable by the robot. For example, uniform sampling can be used to obtain 9,000 pre-grasps from hand 135.

Figure 4A:
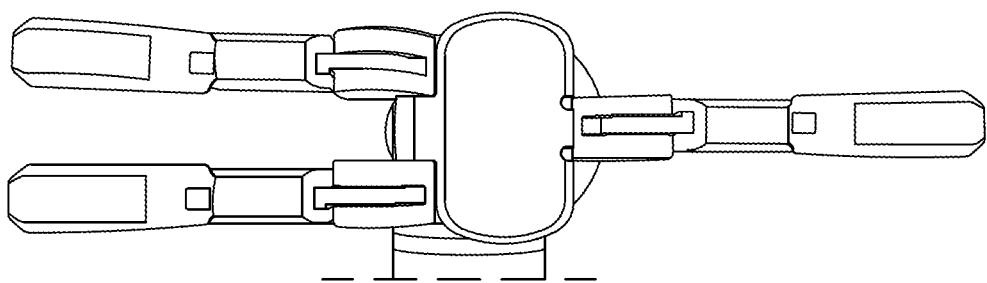
FIGS. 4A-4E are illustrations of a series of robotic hand configurations are shown, according to some aspects of the disclosure.
Figure 4B:
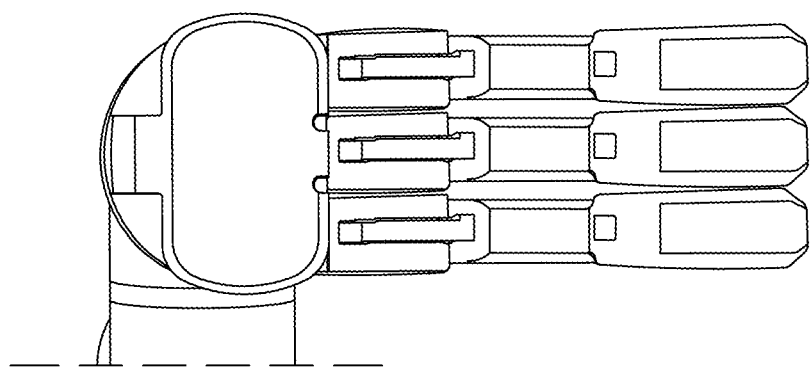
Figure 4C:
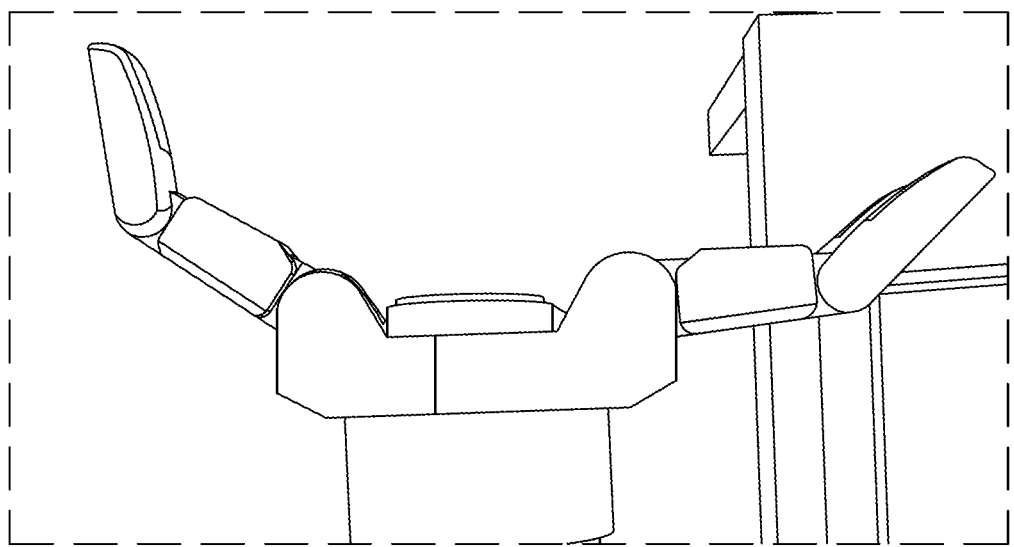
Figure 4D:
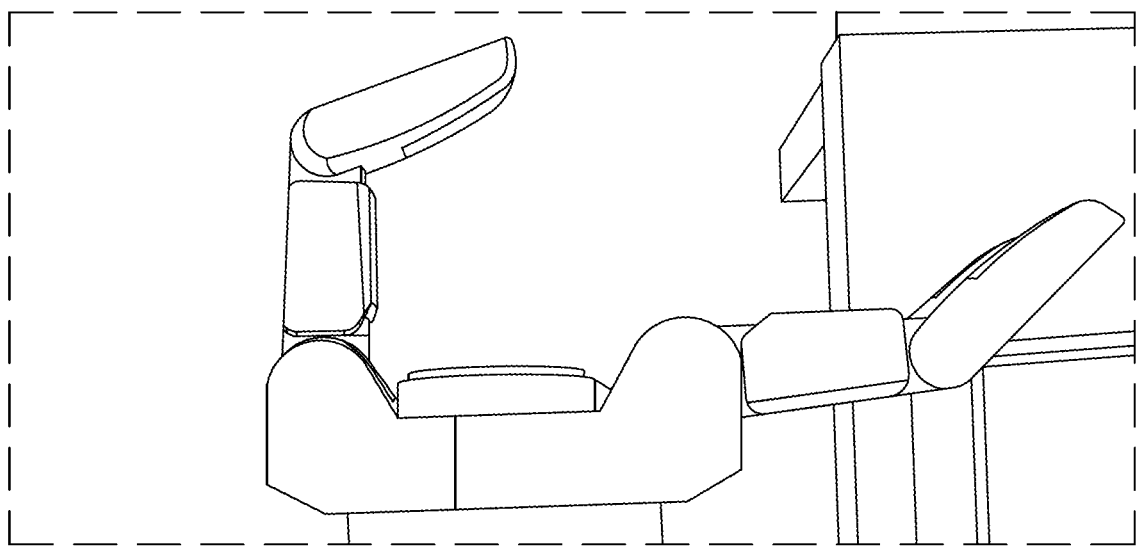
Figure 4E:
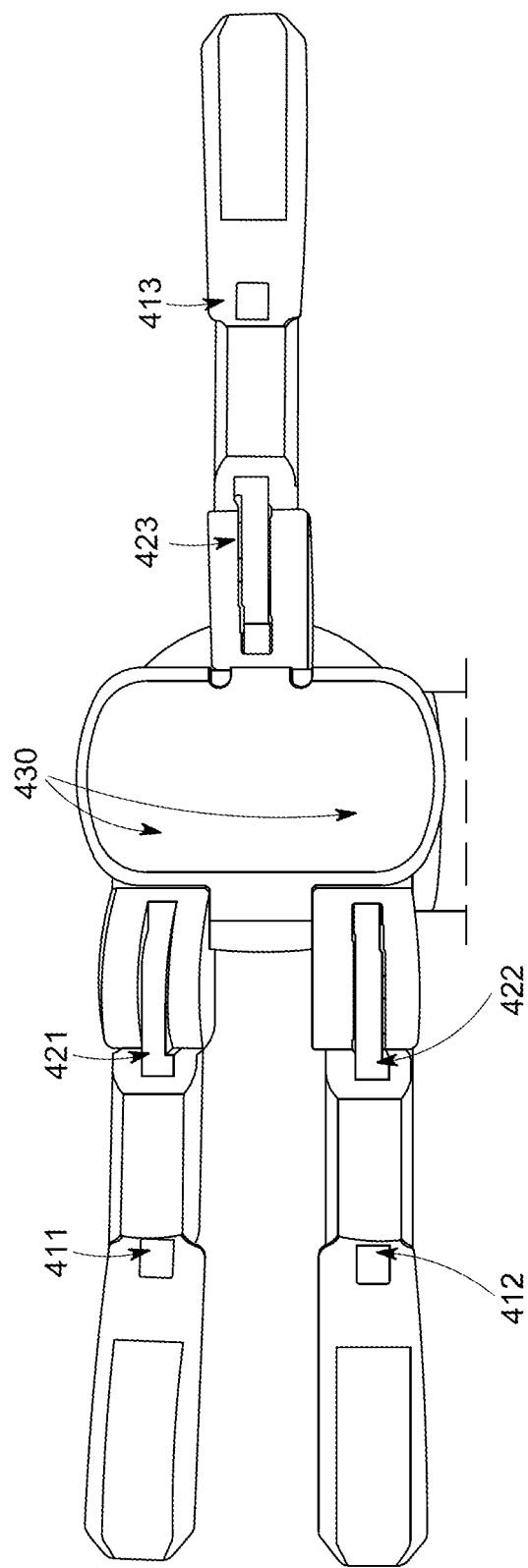

Referring to FIGS. 4A-4E, a series of robotic hand configurations are shown, according to some aspects of the disclosure. FIGS. 4A-4D show the upper and lower bounds of the spread angle and the finger angle for hand 135 that are used to form a pre-grasp set. Hand 135 can be used in system 200, for example to perform process 300 to transfer the tomatoes from bin 210 to bin 220. FIG. 4A and FIG. 4B specifically are top views of hand 135. In FIG. 4A, the spread angle is 0°. In FIG. 4B, the spread angle is 360°. FIG. 4C and FIG. 4D specifically are side views of hand 135. In FIG. 4C, the fingers on the left side are at 30°. In FIG. 4D, the fingers on the left side are at 90°. For generating a pre-grasp set with these upper and lower bounds on the spread angle and the finger angle, step sizes such as 20° per step for the spread angle and 3° per step for the finger angle (finger base joint) can be used. However, depending on the application, it will be appreciated that different upper and lower bounds can be used for the spread angle and the finger angle, and different step sizes for the spread angle and the finger angle can also be used. In FIG. 4E, different components of an example implementation of hand 135 are shown. Three coupled joints are shown to be included on each of the three fingers of the example implementation of hand 135: a coupled joint 411, a coupled joint 412, and a coupled joint 413. Three base joints are also shown to be included on each of the three fingers of the example implementation of hand 135: a base joint 421, a base joint 422, and a base joint 423. These coupled joints and base joints can be controlled to operate the fingers of the example implementation of hand 135, for example to perform grasping functions. Also shown in FIG. 4E is a spread joint 430 for hand 135, where the three fingers can be rotated around spread joint 430 in accordance with various configurations of hand 135.

In practice, not all of the pre-grasps lead to good multiple object grasps. To pick the best pre-grasps, robotic system 130 can be configured to perform a stochastic flexing routine. For example, robotic system 130 can be configured to perform a stochastic flexing routine 10 times from every pre-grasp in the pre-grasp set. The grasping results can be used to calculate a potential pre-grasp value (PPG) as $PPG(\theta, O) = p_0, p_1, p_2, \ldots, p_m$ where $\theta$ is the robotic hand's joint angle vector, O is the object's geometry model, and $p_i$ is the probability of the pre-grasp leading to a successful grasp of i objects.

The average potential pre-grasp value of each spread can be compared to identify the best spread for grasping the target quantity of objects. The pre-grasps can be filtered within that spread based on the success rate for grasping the target quantity of objects, and then a K-means clustering can be applied on the remaining data to obtain clusters of hand configurations. The stochastic flexing routine can then be performed on the centroids of the clusters 100 times, for example, and the potential pre-grasp value for the centroids can be computed. Finally, the best pre-grasp can be selected from the centroids based on its potential pre-grasp value to give a clustered probability-based pre-grasp (CPPG) for each targeted grasp.

A pre-grasp that can successfully transfer a large quantity of objects at once based on the best expectation pre-grasp (BEPG) can also be found. The best expectation pre-grasp (BEPG) can be defined as the pre-grasp that, on average, yields the highest quantity of objects. The same pre-grasp set described above can be relied upon to acquire the best expectation pre-grasp, for example. The potential pre-grasp value can be used to calculate the expectation value (E) for each spread within the pre-grasp set as follows as $E(\theta, O) = p_1 + p_2 * 2 + \ldots + p_i * i + p_m * m$, where the E is the weighted sum of the quantity of grasped objects (i) and the weights are the probabilities ($p_i$) associated with each quantity of grasped objects.

Once the average grasp potentials are known, the spread with the best average grasp potential can be selected. The pre-grasps can be filtered within that spread based on the average grasp potential for each pre-grasp, and K-means clustering can be applied to obtain clusters of hand configurations that have the highest potential for grasping large quantities of objects. The stochastic flexing routine can then be performed on the centroids of the clusters 100 times, for example, and the pre-grasp with the highest average grasp potential value can be selected as the best expectation pre-grasp.

When transferring a large quantity of objects between bins, humans usually grasp a handful of objects in each attempt. For example, humans often try to expand their hands as large as possible and attempt to grasp the maximum quantity of objects for each transfer. This pre-grasp can be referred to as the maximum capability pre-grasp (MCPG). During preliminary transfers between bins, hand 135 can be configured to grasp as many objects as possible. This pre-grasp can be found in one approach by computing the volume of the in-grasp space of hand 135 being used. The grasp with the largest volume can then be used to get the maximum capability pre-grasp for hand 135. The volume of every pre-grasp in a pre-grasp set can be calculated using a variety of techniques, and the pre-grasp with the largest volume can be used as the maximum capability pre-grasp for hand 135.

Using a stochastic flexing routine, several distinct end-grasp types associated with the quantity of objects in hand 135 can be identified for a single pre-grasp. The end-grasp can be defined as the hand configuration when the grasping routine has been completed. In practice, some end-grasps have a higher chance of grasping a particular quantity of objects compared to other end-grasps. To compare different end-grasps, a success rate for the grasp type can be represented as $SRG(k,O) = \{s_0, s_1, s_2, \ldots, s_m\}$, where k is the index of a grasp type and $s_i$ is the success rate that the grasp type k gas in grasping i objects. An appropriate end-grasp type can be selected based on its SRG values. Using collected data, a K-means clustering can be applied on the end-grasps to obtain clusters of hand configurations that are likely to fit the target quantity of objects. Centroids with the highest neighbors can be used as the end-grasp, for example. This end-grasp can then be used to compute the finger flexion synergy.

Before robotic system 130 lifts its hand 135, robotic system 130 can sense the objects in the grasp and predict how many objects are expected to remain in the grasp after lifting. This prediction functionality can be important for successful performance of multiple object grasping and consequently, successful transfer of objects between bins.

The prediction functionality can be considered part of the multiple object grasping action itself, because robotic system 130 can continuously re-grasp until robotic system 130 senses that the desired number has been reached and it can lift hand 135 from the original bin. Since modeling the physics of the objects within the bin is computationally expensive (consumes computing resources), a data-driven deep learning approach can be developed to estimate the quantity of objects within the grasp of robotic system 130 when hand 135 is inside of a bin.

The deep learning approach can include training multiple classifiers. For example, one or more classifiers can be trained that estimate whether a particular number of objects are grasped, whether more than a certain number of objects are grasped, whether less than a certain number of objects are grasped, etc. In a more particular example, a classifier can be trained to classify whether zero objects are grasped or a non-zero number of objects are grasped, two or non-two objects, three or non-three objects, greater than or equal to two objects, and less than two objects. In another more particular example, five classifiers can be trained that estimate, respectively, zero objects or non-zero objects grasped, two or non-two objects grasped, three or non-three objects grasped, greater than or equal to two objects grasped, and less than two objects grasped. It will be appreciated that a variety of different classifiers (learning models) can be trained and implemented as part of a deep learning approach as appropriate for a given application. For example, the input/output data dimensions may be different, the activation functions used may be different, different types of neural network models can be used, and various quantities and types of hidden layers can be used, among other possible variations to one or more learning models used in multiple object grasping involving robotics.

Figure 5A:
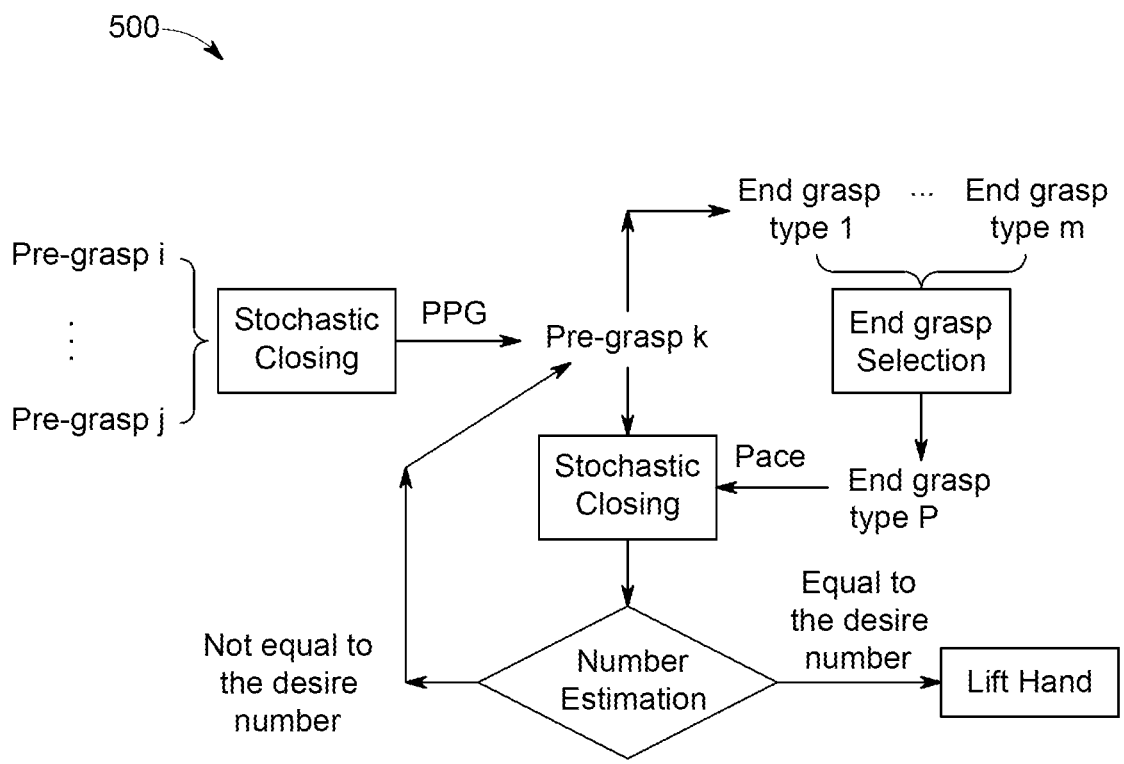
FIG. 5A is a flowchart illustrating an example process for stochastic grasping using robotics, according to some aspects of the disclosure.

Referring to FIG. 5A, a flowchart illustrating an example process 500 for stochastic grasping using robotics is shown, according to some aspects of the disclosure. Process 500 can be performed by robotic system 130 to perform multiple object grasping. Process 500 generally involves receiving a target number of objects to be grasped, performing a stochastic flexing/extending routine, using the results to compute the probability-based pre-grasp potential (PPG), selecting the best pre-grasp, and selecting an end-grasp (SRG). The difference between the pre-grasp and the end-grasp can then be used to calculate a flexing pace for hand 135. The fingers of hand 135 keep flexing until the lower bound of a set of stop criteria has been met. The number of objects actually in the grasp of hand 135 can then be estimated, such as by using a classifier as described in more detail below. If robotic system 130 determines that the target number of objects are in the grasp of hand 135, then robotic system 130 will lift hand 135.

Figure 5B:
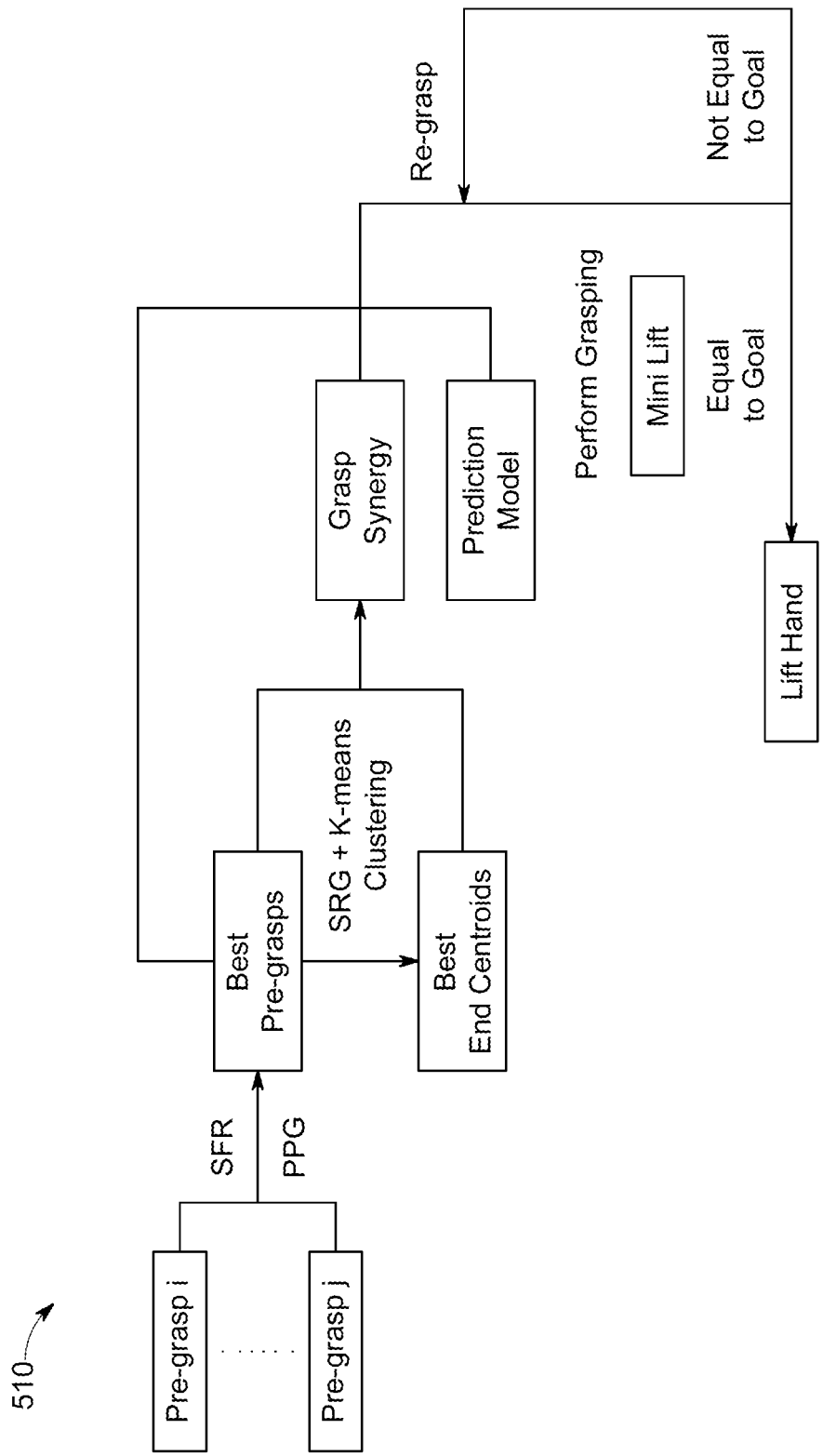
FIG. 5B is a flowchart illustrating an example process for grasping multiple objects using robotics, according to some aspects of the disclosure.
Figure 5C:
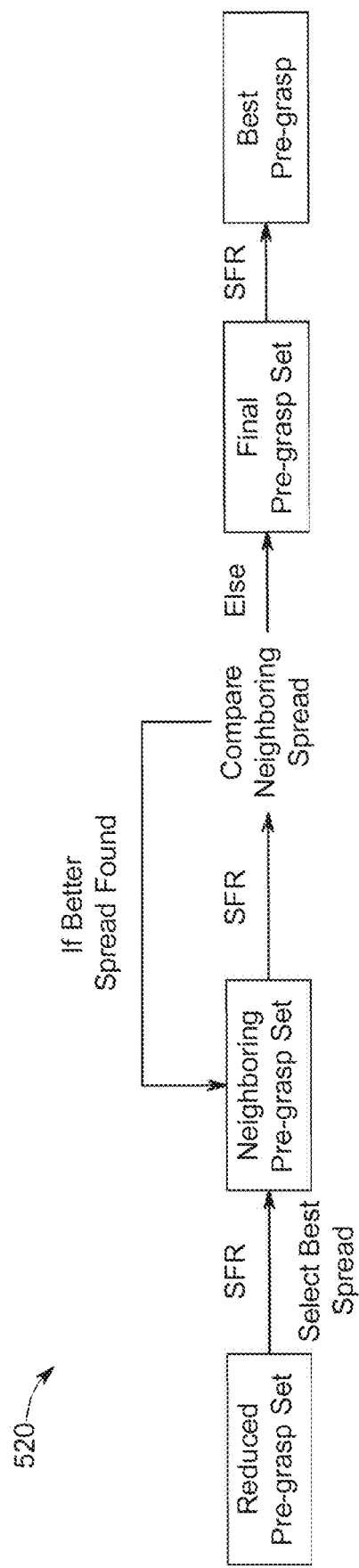
FIG. 5C is a flowchart illustrating an example process for smart uniform random sampling using robotics, according to some aspects of the disclosure.
Figure 6A:
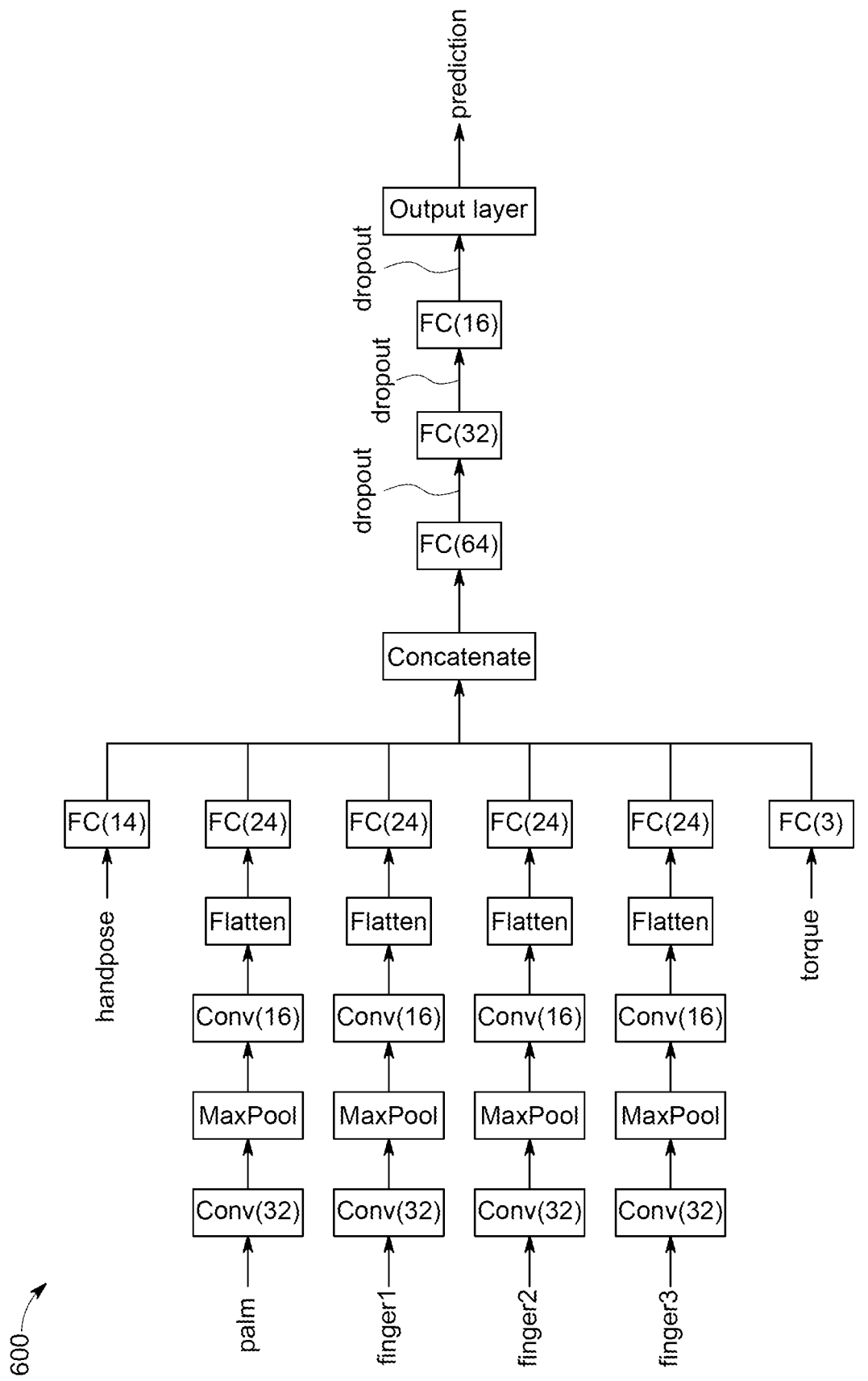
FIG. 6A is a block diagram showing an example model that can be used for multiple object grasping using robotics, according to some aspects of the disclosure.

Referring to FIG. 5B, a flowchart illustrating an example process 510 for grasping multiple objects using robotics is shown, according to some aspects of the disclosure. Process 510 can be performed by robotic system 130 using the techniques discussed herein. Referring to FIG. a flowchart illustrating an example process 520 for smart uniform random sampling using robotics is shown, according to some aspects of the disclosure. Process 520 can likewise be performed by robotic system 130 using the techniques discussed herein Referring to FIG. 6A, an example model 600 of a classifier that can be used for multiple object grasping using robotics is shown, according to some aspects of the disclosure. In model 600, the hand configuration input represents a vector that contains the pre-grasp and the current hand configuration for the robotic system 130. The torque input represents a vector that contains strain gauge readings from each finger of hand 135. The palm input represents data generated by tactile sensors on the palm of the hand 135. The inputs finger 1, finger 2, and finger 3 represent data generated by a tactile sensor array on each finger of hand 135. The output prediction represents data indicative of the classification result generated by model 600. The output can be a binary classifier, such as providing an indication of true or false.

The input data dimensions for example model 600 are (1,1,3). The input data contains the pre-grasp of the current hand configuration (14), the tactile sensor information (96), and the readings from the strain gauges present in the couple joints of the robotic hand (3). The activation function used for the output layer is sigmoid with a single class as the output. Model 600 can be represented as $n=f(h,t,s)$, where h is a vector representing the hand configuration, t is a vector representing the tactile sensor array, and s is a vector containing the three stain gauge readings. The output n is the prediction of whether the grasp would contain the target quantity of objects. The shape for the tactile sensor array can be rearranged to account for spatial information. The tactile sensors in the palm can be represented as a 4×7 matrix and the tactile sensors in each finger can be represented as a 3×8 matrix. It will be appreciated that model 600 is provided as an example, and different input, output, activation function, number and design of hidden layers, and other aspects of a similar learning model can vary depending on the robot being used and the environment the robot is used in.

To reduce the number of false positives when performing a grasping routine, the non-zero classifier along with another classifier or classifiers can be used to estimate when to lift hand 135. If the non-zero model estimates non-zero for three consecutive time steps, for example, and the other classifier or classifiers estimate true for one time step, hand 135 may be lifted. This concept can be referred to as a voting algorithm. The ≥2 classifier (model) can be used when grasping the most quantity of objects and the 1, 2, and 3 object classifiers (models) can be used when the respective quantity of objects are grasped.

Additionally, a multi-object grasp and transfer action can include a transfer sub-action. For example, if the number of objects in the grasp of hand 135 when lifted from the bin is desirable (e.g., matches the target quantity, satisfies a threshold), the objects in the grasp can be transferred to the receiving (destination) bin. If the number of objects in the grasp is not desirable (e.g., does not match the target quantity, does not satisfy a threshold), the object(s) can be dropped back into the original bin, and the robotic system 130 can repeat the grasping routine. Accordingly, as described above, a multiple object grasp and transfer action can include various actions, such as: selecting pre-grasps based on potentials, selecting pre-grasps based on expectations, selecting pre-grasps based on volume, selecting finger flexion synergy, lifting based on prediction, and/or the transfer sub-action.

After a multi-object grasp and transfer action, a number of objects can be added to the receiving bin. In this case, the system can transition to a new state with new state transition probabilities. The programming of robotic system 130 may then focus on actions including grasping a maximum quantity of objects, grasping one object, grasping two objects, and grasping three objects. The state transition probability distribution for each of these actions can be obtained through data collection.

A value iteration process based on the below Bellman equation can be used to compute a policy (e.g., an optimal policy) at each state of the Markov-decision-process-based multiple object grasping and transferring model. After getting the policy, the below algorithm (example pseudocode) can be used for Markov-decision-process-based multiple object grasping and transferring. It is important to note that other types of Markov-decision-process solvers can be used other than value iterations, though value iterations can be highly efficient.

$$V^*_{t+1}(s) = \max \sum_{s'} p(s, a, s')[r(s, a, s') + \lambda V^*_t(s)]$$

| Algorithm 1 MDP-MOGT algorithm |  |
|---|---|
| | Input: target |
| 1: | Initialize current and objectsGrasped as 0 |
| 2: | while current ≠ target do |
| 3: | Initialize isLift as False |
| 4: | choose pre-grasp Type following policy π |
| 5: | choose corresponding end-grasp Type |
| 6: | insert hand and start grasping |
| 7: | isLift = output from voting algorithm |
| 8: | if isLift = True then |
| 9: | lift from pile |
| 10: | objectsGrasped = check number of objects in hand |
| 11: | else |
| 12: | reset hand to pre-grasp and re-grasp |
| 13: | end if |
| 14: | if current + objectsGrasped <= target then |
| 15: | current+ = objectsGrasped |
| 16: | transfer objects to destination bin |
| 17: | end if |
| 18: | end while |

Moreover, a stochastic flexing/extending routine can be used when grasping objects from a pile. Instead of flexing the fingers of hand 135 with a fixed speed, robotic system 130 can be configured to use the stochastic flexing/extending routine to control the joints of hand 135 with a random factor. Referring to the example implementation of hand 135 illustrated in FIG. 4E, the base joints of each finger (421, 422, 423) can randomly choose a velocity from the set [3°/step, 0°/step, −3°/step] with the probability of 70%, 20%, and 10%, respectively. Different step sizes can be used for different types of robotic hands. The velocity probabilities chosen in this example generally allow the fingers of hand 135 to close the majority of the time, while retaining the ability to reopen or stay at the same position. The coupled joints of each finger (411, 412, 413) in the example implementation of hand 135 illustrated in FIG. 4E can move with the base joints with a ratio of 1/3, where the spread joint (430) angle remains the same. This approach allows hand 135 to form different kinds of shapes and provides diversity for exploring multiple object grasping.

The fingers of hand 135 can stop flexing/extending when they reach a stop criteria. Instead of defining a stop criteria, the lower bound and upper bound of the joint torques for both the base joints and the coupled joints can be used. Another stop criteria that can be used is when all the base joints stop moving and at least one coupled joint stops moving for more than four steps. When one of the base joints faces an extremely large torque, the corresponding finger can be decoupled, and the base joint can stay at the same position while the coupled joint keeps moving. The stop criteria can be chosen both to explore diversity for multiple object grasping as well as ensure safety of hand 135. The stochastic flexing/extending routine can be performed using the algorithm (pseudocode) shown below.

| Algorithm 2 Stochastic flexing/extending routine |  |
|---|---|
| 1: | Insert hand into pile with a pre-grasp |
| 2: | Random select $th_{base}$ and $th_{coupled}$ |
| 3: | count ← 0 |
| 4: | terminate ← 0 |
| 5: | while terminate == 0 do |
| 6: | for finger, in Finger do |
| 7: | if $torque_{bases}$ < $th_{base}$ then |
| 8: | random pick velocity |
| 9: | else |
| 10: | $v_{bases}$ ← 0 |
| 11: | if $torque_{coupleds}$ < $th_{coupled}$ then |
| 12: | random pick velocity |
| 13: | else |
| 14: | $v_{coupleds}$ ← 0 |
| 15: | end if |
| 16: | end if |
| 17: | end for |
| 18: | Check velocity for each finger |
| 19: | if All finger stops then |
| 20: | count+ = 1 |
| 21: | end if |
| 22: | if count >= 4 then |
| 23: | terminate = 1 |
| 24: | end if |
| 25: | end while |
| 26: | Lift hand up |

Figure 6B:
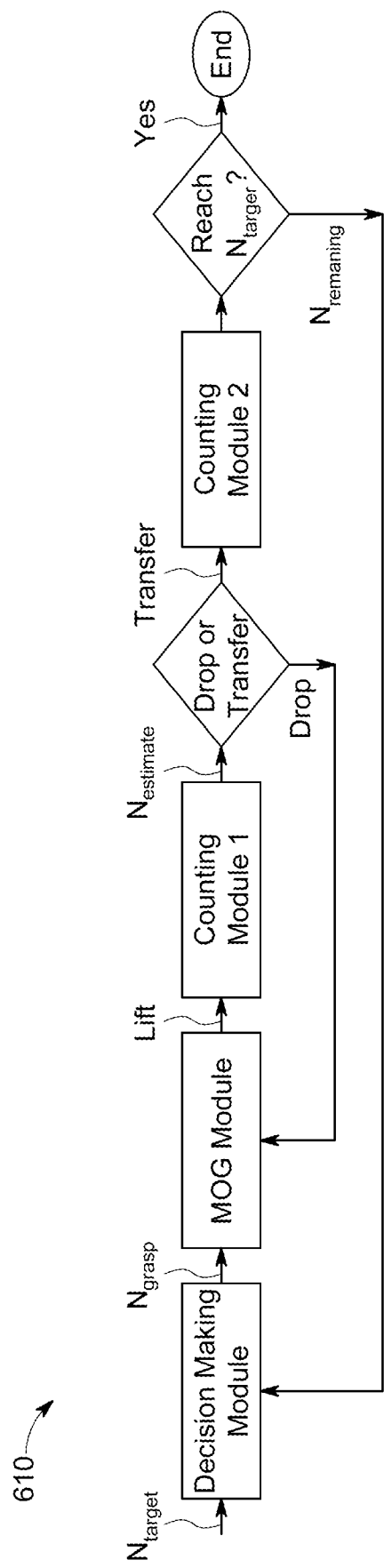
FIG. 6B is a block diagram showing an example robotic grasping and transferring pipeline that can be implemented by the control system of FIG. 1, according to some aspects of the disclosure.

Referring to FIG. 6B, an example grasping and transferring pipeline pipeline 610 that can be used by robotic system 130 is shown, according to some aspects of the disclosure. As shown, the pipeline 610 includes a decision making module that determines the target number of objects to grasp for the next grasping trial during the transferring process. The pipeline 610 also includes a multiple object grasping (MOG) module that handles the grasping of the target number of objects determined by the decision making module. The pipeline 610 further includes a first counting module that that is vision-based and detects the number of objects being grasped in hand 135 when hand 135 is outside of bin 210. Also, the pipeline 610 includes a second counting module that keeps track of the number of objects transferred into bin 220. Depending on whether the total number of objects in bin 220 will exceed the target quantity after transferring the current objects in the grasp, robotic system 130 can decide whether to perform the transfer or drop the objects back into bin 210. The specific processing architecture of the pipeline 610, including the separate modules and associated functionality as shown in FIG. 6B, can provide advantages in terms of the operation of robotic system 130.

Figure 6C:
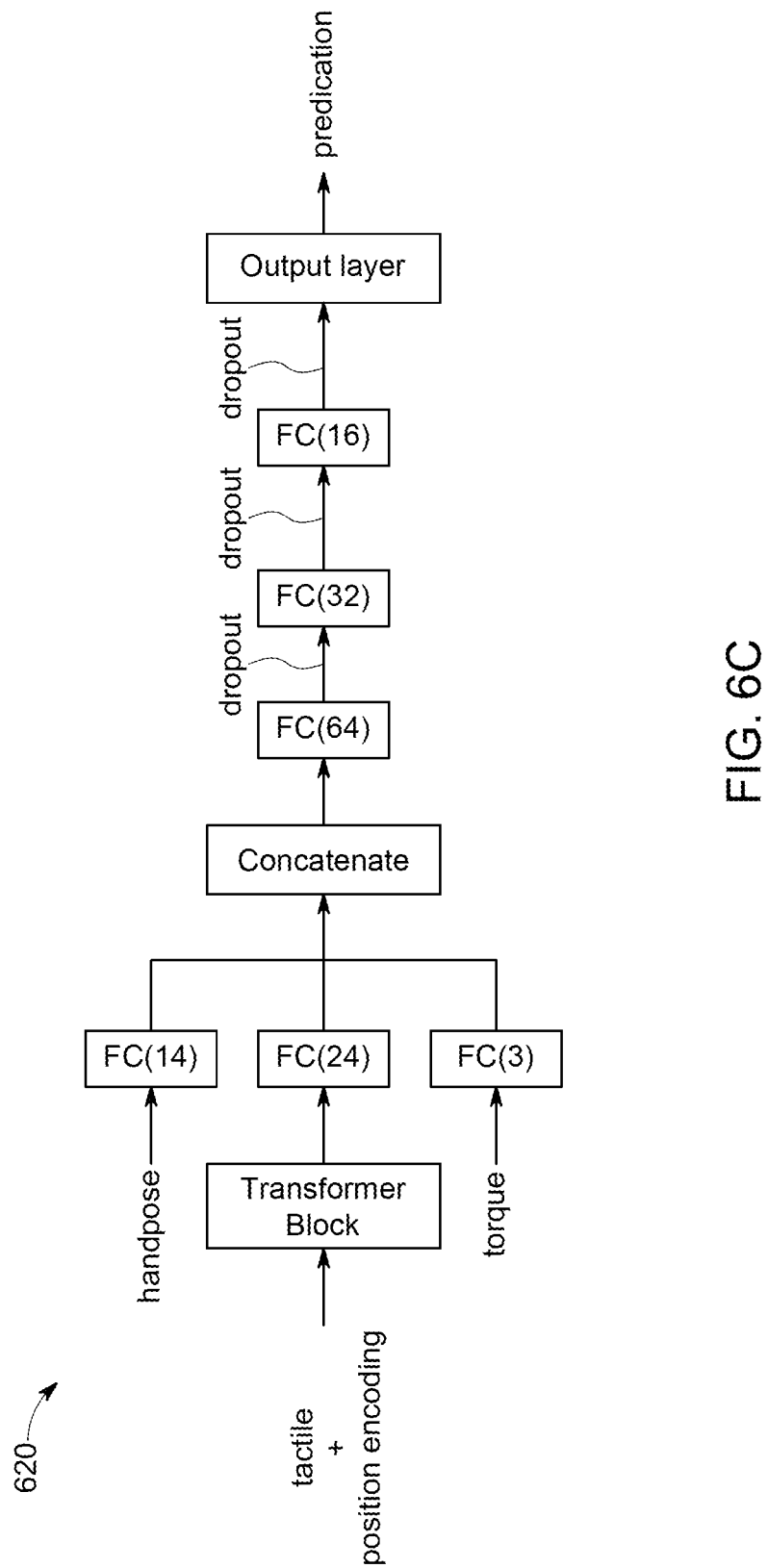
FIG. 6C is a block diagram showing another example model that can be used for multiple object grasping using robotics, according to some aspects of the disclosure.

Referring to FIG. 6C, a block diagram showing another example model 620 that can be used that can be used by robotic system 130 is shown, according to some aspects of the disclosure. In model 620, the input data dimension can be 113, which contains hand pose (14), readings from tactile sensors (96) plus the location matrix of the tactile sensors (48), readings from strain gauges (coupled joints, 3). Also, the activation function of the output layers of model 620 can be a sigmoid function with a class number of 1. Model 620 can again be represented by the equation n=f(h,t,s), where h is a vector representing the pose of hand 135, t is a vector representing the tactile reading array together with the representative location of the sensors, and s is the vector containing the three strain gauge readings of the coupled joints. The output n is a prediction of whether the targeted number of objects will be grasped in hand 135 when the grasping trial has finished (e.g., when the hand is lifted out of the pile). Notable, model 620 includes a transformer block, as will be discussed in more detail below with respect to FIG. 6G.

In the diagram of model 620 shown in FIG. 6C, handpose can be a vector that contains the starting pose and the current pose of hand 135 and the tactile+position encoding can be the concatenation of the tactile sensor reading with the position and orientation of tactile sensor. The tactile sensor reading can be divided into 4 patches, where each patch is one region of the tactile sensors on hand 135. Then, each patch can be concatenated with the position and orientation of the tactile sensor located in the center area of the corresponding patch. Also, in the diagram of model 620 shown in FIG. 6C, torque can be a vector that contains the strain gauge reading for each coupled finger joint of hand 135, and prediction can be the classification result. Moreover, FC(64), FC(32), FC(24), and FC(16) refer to example fully connected layers with 64, 32, 24, and 16 units, respectively. The dropout rate can be 0.5 in some examples.

Figure 6D:
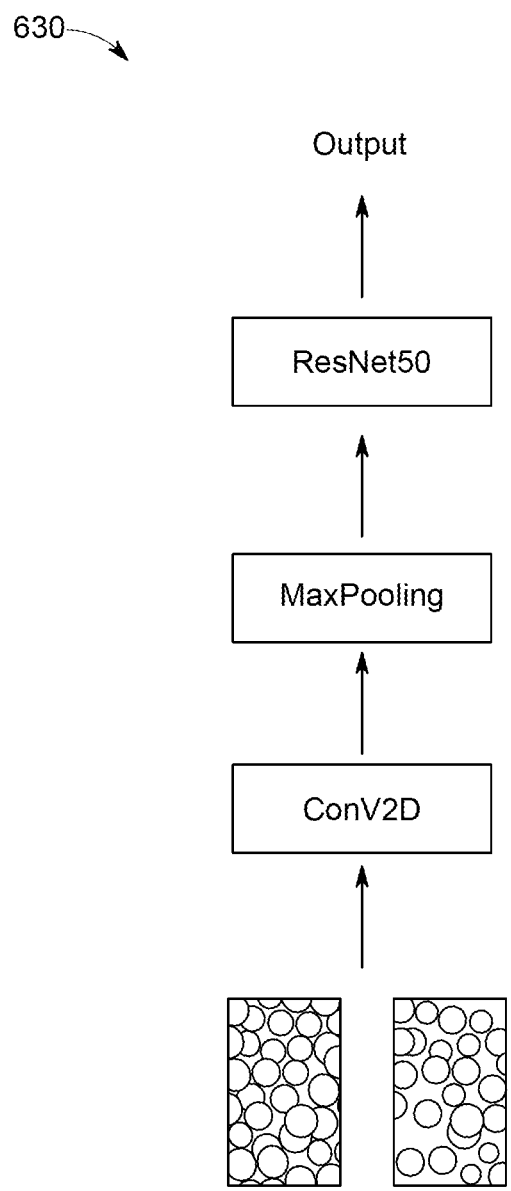
FIG. 6D is a block diagram showing yet another example model that can be used for multiple object grasping using robotics, according to some aspects of the disclosure.

Referring to FIG. 6D, a block diagram showing an example rotation model 630 that can be used by robotic system 130 is shown, according to some aspects of the disclosure. Rotation model 630 can generally be used by robotic system 130 to help decide the rotation angle of hand 135 before inserting hand 135 into bin 210 to increase the chance of a successful grasp. As shown, rotation model 630 can include a convolutional layer (e.g., a two-dimensional convolution layer), a max pooling layer, and also a ResNet-50 layer, for example. The convolutional layer can generally provide a convolution over the input signal (e.g., a 2D convolution). The max pooling layer can generally perform a pooling operation that selects a maximum element from a region of a feature map covered by a filter, thereby returning the most prominent features. The ResNet-50 layer can be a convolutional neural network (CNN) that is 50 layers deep, and can be pretrained on image data (e.g., millions of images). Rotation model 630 can be trained by inserting hand 135 into a pile of objects in bin 210 without rotation. Then, an image can be taken of the objects in bin 210, and the image can be rotated and cropped with the size of hand 135. Finally, the image can be labeled based on the angle that hand 135 was manually rotated to. Other possible implementations of rotation model 630 beyond what is shown in FIG. 6D are possible.

Before performing a full lift at the end of a grasping trial using robotic system 130, a "mini lift" step can be added to increase the chance of a successful grasp. When hand 135 is buried inside a pile of objects (e.g., in bin 210), the contact can be complex. Even with a deep learning based model, difficulties may arise in terms of generating accurate estimations of the number of objects that will remain in the grasp of hand 135 after lifting. To increase the chance to get the target number of objects, robotic system 130 can be configured to lift hand 135 up for the height of one object such that the force balance between the objects being grasped and the objects in the pile holding them are broken. The mini lift step can include training model 620 with the same modalities being recorded when hand 135 has lifted for the height of an object.

Figure 6E:
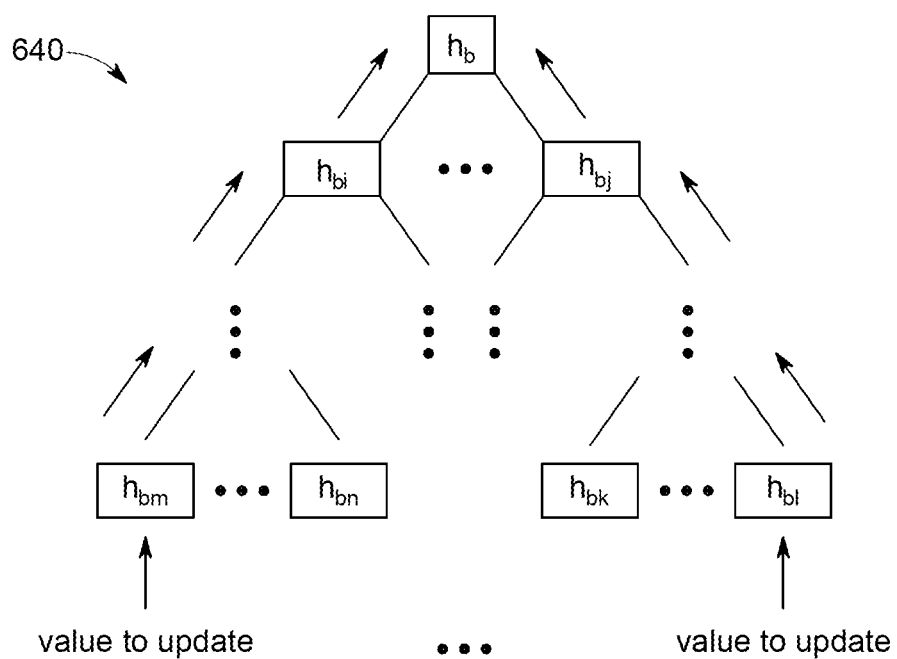
FIG. 6E is a block diagram showing an example experience tree model that can be used for multiple object grasping using robotics, according to some aspects of the disclosure.

Referring to FIG. 6E, a block diagram showing a model of an example experience tree 640 that can be used by robotic system 130 is shown, according to some aspects of the disclosure. Experience tree 640 can be used to take advantage of the exploration into the configuration space of the fingers of hand 135 done by the stochastic flexing routine as discussed above. To solve the complex and probabilistic environment based decision making problem, the experience tree 640 can be built of different configurations o find 135 to find an optimal path of hand movement in the configuration space to achieve an optimal result. Since the number of each node expands exponentially towards the height, experience tree 640 can be built using the last 5 steps' hand joints movement reading before lifting, from the recording during the stochastic flexing routine exploration. For all the trials performed using the same selected pre-grasp, 5 steps can be traced back from the movement the hand lifts and used as root nodes for experience tree 640. From the selected root nodes, the children can be expanded until reaching the fifth step. Since during the stochastic flexing routine 3 choices may be faced at each step, one single root on experience tree 640 can have a maximum size of 6561.

After the structure of experience tree 640 is built, the clause of the nodes can be updated using a back propagation process, as illustrated in FIG. 6E, to find the branch with the highest reward. Based on the grasping result, a value of +1 can be assigned as a reward and a value of −1 can be assigned as a penalty. For example, if one grasp trial achieves the target number of objects at the end of the grasping trial, a value of +1 can be assigned to all the 5 steps' nodes on experience tree 640. Alternatively, if the grasp trial fails, a value of −1 can be assigned to all the 5 steps' nodes on experience tree 640. In FIG. 6E, the root node is $h_b$, $h_{bi}$ and $h_{bj}$ are the child nodes of the root node, and $h_{bm}$, $h_{bn}$, $h_{bk}$, and $h_{bl}$ are the leave nodes. They represent the base joint angle readings of the three fingers on hand 135.

Figure 6F:
FIG. 6F is a diagram illustrating an example process for transition synergy with the experience tree of FIG. 6E is shown, according to some aspects of the disclosure.

After the value of each node has been finalized, the root nodes with highest value can be chosen as the nodes to transit from MOG synergy. For the children of the selected root nodes, a breadth first search (BF S) can be performed to select the children with the highest value from root. This process can be repeated until the end of experience tree 640 is reached, and thereby a few branches have been built and used as optimal decisions. When performing grasping, the Euclidean Distance (ED) can then be monitored between the current hand configuration and the selected root nodes of experience tree 640. Once the ED is smaller than a threshold, robotic system 130 can switch the grasping synergy from the MOG synergy to the selected branches of experience tree 640. Referring to FIG. 6F, a diagram illustrating an example process 650 for transition synergy with experience tree 640 in robotic system 130 is shown, according to some aspects of the disclosure. The experience tree 640 can be a Monte Carlo tree search (MCTS) algorithm, among other possible implementations.

Figure 6G:
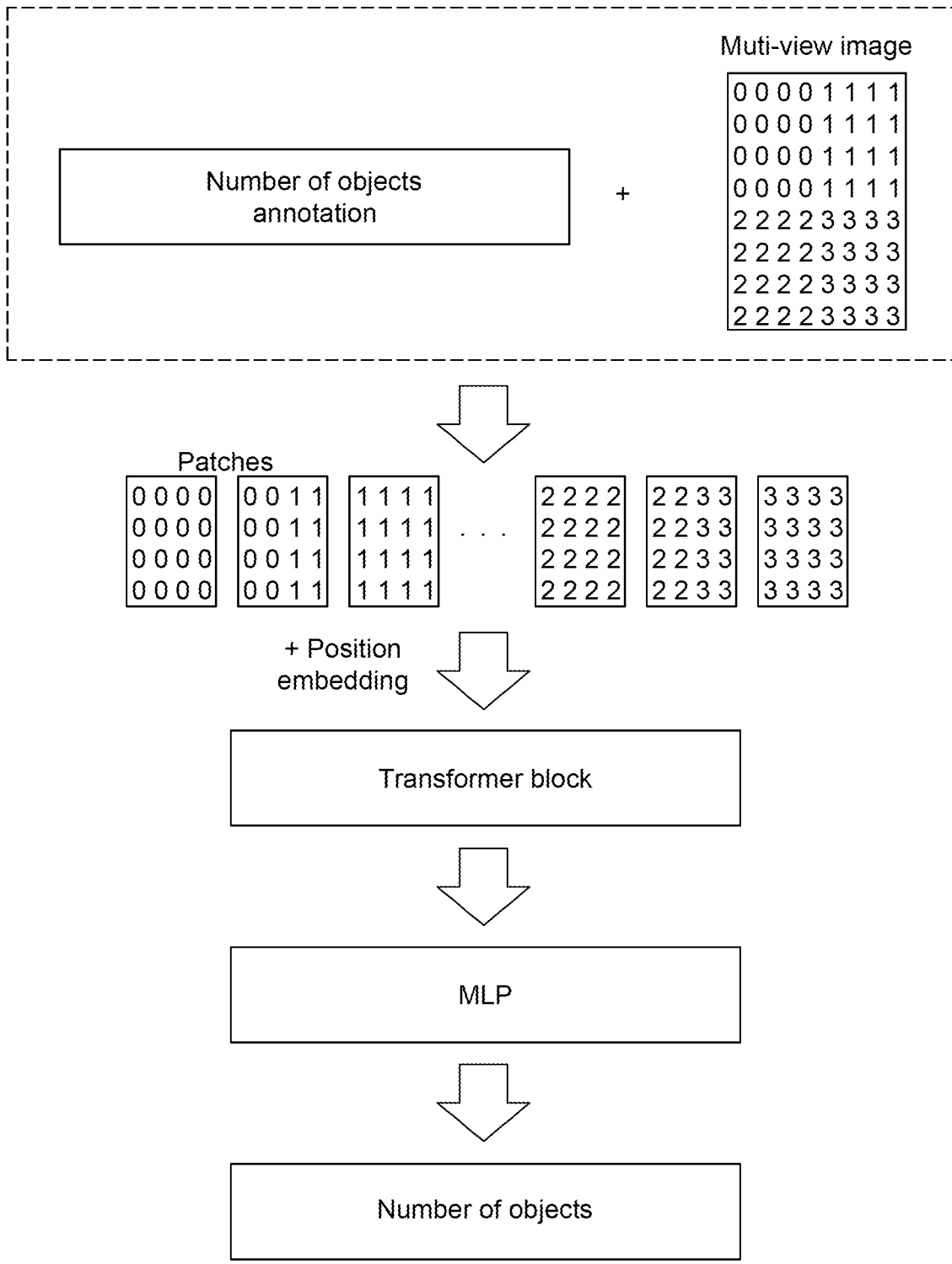
FIG. 6G is a diagram illustrating a deep learning approach to object counting that can be used by the control system of FIG. 1, according to some aspects of the disclosure.

Referring to FIG. 6G, a diagram illustrating a deep learning approach to object counting that can be used by robotic system 130 is shown, according to some aspects of the disclosure. The approach generally takes advantage of the attention of transformers to incorporate information from the different camera perspectives by arranging images from different camera perspectives as a single input image, and subsequently dividing the input image up into position embedded patches that are fed into a transformer in parallel. The transformer block shown in FIG. 6G can generally be the same as or similar to the transformer block of model 620 as shown in FIG. 6C, for example. The transformer block can be implemented using various types deep learning architectures that rely on the attention mechanism. When compared to approaches such as recurrent neural network architectures, the transformer can require less training time by virtue of parallelized processing of an input sequence (e.g., parallel processing of the embedded image patches).

The transformer can include a normalization layer, feed-forward connections, a multi-head attention layer (e.g., with four heads in parallel and 64 transformer layers), multi-layer perception of dense layers with Gaussian Error Linear Units (GELUs), and dropout layers.

The image patches can be 12 pixel×12 pixel patches, in some examples, that are fed into dense layers and projected into a dimension of 128. Position embedding can then be added to provide spatial relationships among the smaller images for the model (e.g., model 620). The position embedded inputs can then be fed into the transformer encoder, and the outputs can be sent through normalization, flattening, and dropout layers before sending to another series of dense and dropout layers for classifications of the number of objects. Since a large estimation error on the number of objects is inefficient and can have irreversible and undesirable effects, a loss function can be implemented that is sensitive to the estimation error as $Loss=[(1/70)*(T_k-P_k)-1]*\log(p_k+10^{-20})$, where $T_k$ and $P_k$ are the ground truth and predicted number of objects and $p_k$ is the probability for the predicted number of objects.

Figure 7A:
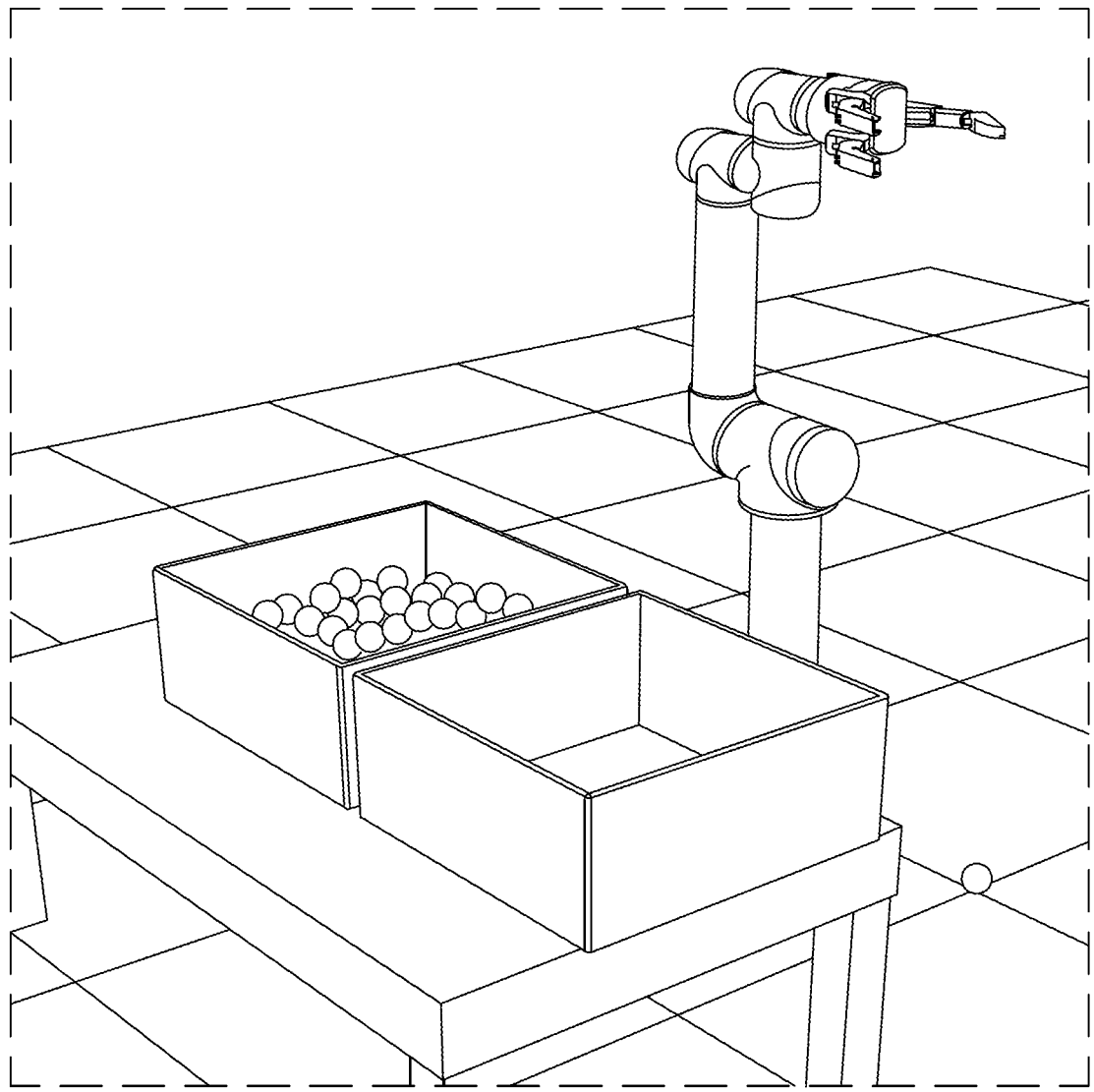
FIGS. 7A-7D are illustrations of example robotic system setups where multiple object grasping using robotics can be performed, according to some aspects of the disclosure.
Figure 7B:
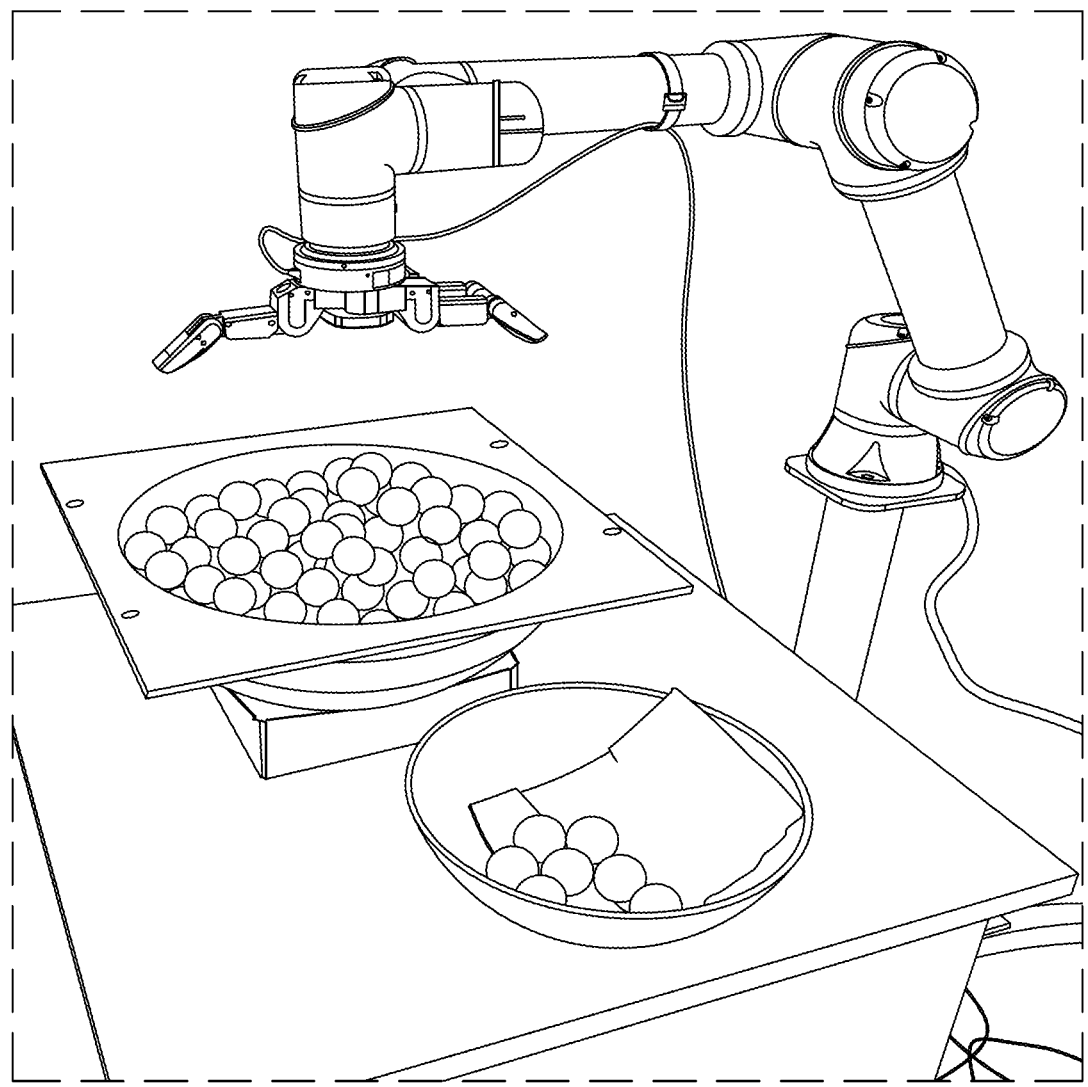
Figure 7D:
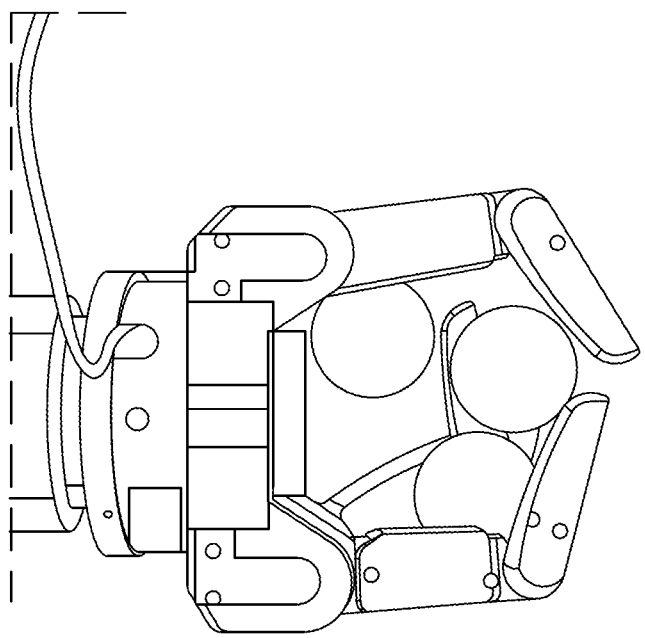
Figure 7C:
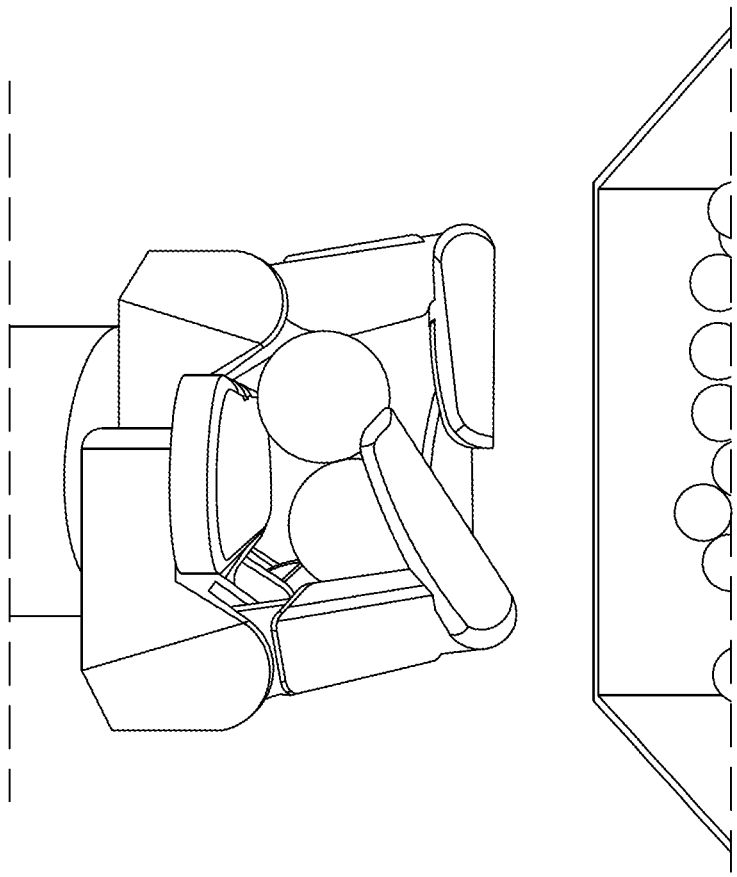

These approaches were tested both in a virtual simulation and in a real-world example. Referring to FIGS. 7A-7D, example robotic system setups where multiple object grasping was used are shown, according to some aspects of the disclosure. FIG. 7A provides an example illustration of a virtual simulation of a robotic system that was used. Virtual simulations can be run using programs such CoppeliaSim, for example, among others. FIG. 7B shows an example illustration of a real-world robotic system, where a collection of spherical objects (e.g., ping-pong balls) were placed in an original bin and a robot transfers the spherical objects from the original bin to the receiving bin. FIG. 7C provides an example illustration of multiple spherical objects in the grasp of a robotic hand in the virtual simulation of FIG. 7A. FIG. 7D provides an example illustration of multiple spherical objects in the grasp of a robotic hand in the real-world system of FIG. 7B. The experimental results described below are merely intended to provide additional insight into the functionality of certain aspects of the disclosure. The experimental results are not exhaustive, and are not limiting on any aspects of the disclosure in any way. Also, referring to FIG. 7E, a table of example objects grasped by robotic system 130 during simulation of robotic system 130 is shown, according to some aspects of the disclosure.

Testing of the example setup shown in FIG. 7B revealed that the robotic hand is capable of grasping a maximum of 5 objects. To test the Markov-decision-process-based multiple object grasping and transferring approach, a target of 0 objects was used to illustrate advantages of high quantity transferring using multiple object grasping. Two metrics that were used to evaluate the entire approach were the number of transfers made between the two bins and the total number of lifts performed from the pile. These two metrics highlight the efficiency of the transfer approach.

In the virtual simulation setup shown in FIG. 7A, a robotic hand is attached to a robotic arm, and objects are placed in a bin in front of the robotic system. The virtual model in this example only contains one tactile sensor on each tactile sensing region. In the real-world example system shown in FIG. 7B, tactile sensors were attached to the region to replicate the virtual robotic hand within the real system. The spherical objects in both the virtual and real-world example systems have a radius of 2 centimeters and a weight of 2.7 grams.

Data for clustered probability-based pre-grasp and best expectation pre-grasp was collected using both the virtual and real-world example systems shown in FIG. 7A and FIG. 7B, respectively. In the virtual simulation, each of the 9000 hand configurations from the pre-grasp set were repeated 10 times using a stochastic flexing routine. For clustered probability-based pre-grasp and best expectation pre-grasp, the approaches described above can be used to identify the best pre-grasps. For clustered probability-based pre-grasp, focus was placed on selecting pre-grasps for grasping 1, 2, and 3 objects. For selecting the number of clusters within each section, the inertia and distortion of the data was visualized and the number of clusters where the inertia and distortion are decreasing linearly were selected. Inertia can be defined in this case as the sum of the squared distances of the data sample to their closest centroids. Distortion can be defined as the average of the squared distances from the centroid of each cluster. In the real-world system, the top 3 pre-grasps for the spheres from the simulation data for both clustered probability-based pre-grasp and best expectation pre-grasp were used. A stochastic flexing routine was then performed using those pre-grasps 50 times to select the best pre-grasp for each grasp type for the real-world system.

For getting the end-grasp for the pre-grasps within the virtual simulation, data collected from the virtual simulation for the pre-grasps was used. Inertia and distortion were used to accomplish this as well. For getting the end-grasp for the grasps in the real-world system, the data collected within the real system for each of the real system pre-grasps was used, along with inertia and distortion.

For the Markov-decision-process-based multiple object grasping and transferring approach, the state transition probabilities are needed for each of the pre-grasps in the action space. To get the state transition probabilities for the pre-grasps within the simulation, each pre-grasp and its corresponding end-grasp were used along with the estimation model to grasp the sphere 50 times. The resulting data provides the state transition probabilities for each pre-grasp when performing the grasping routine with the model and the finger flexion synergy. The state transition probabilities for each pre-grasp were also computed with a stochastic flexing routine. The same procedure was performed in the real-world system to collect data and compute the state transition probabilities for the real system pre-grasps.

For grasping the maximum quantity of objects, two approaches are described above: best expectation pre-grasp and maximum capability pre-grasp. Each grasp type was performed 10 times using a stochastic flexing routine on the spheres in the real system. The results can be found in the table shown in FIG. 8. The percentages within the table represent the percentage of times the pre-grasp was able to grasp the corresponding number of spheres. Based on the results, best expectation pre-grasp outperformed maximum capability pre-grasp in yielding more quantity of objects on average.

To test the performance of estimation models as described above, 5 estimation models were trained. The models were for estimating if the grasp contains at least one object (non-zero), one object, two objects, three objects, or at least two objects. The precision and the root-mean-square deviation (RMSE) for each model can be found in the table shown in FIG. 9. Precision represents the percentage of the correct predictions among all predictions. Root-mean-square deviation represents the standard deviation of the prediction error.

For training each model, early stopping on the validation loss was used to prevent over-fitting. The Adam optimizer with a learning rate of 0.001 was also used, and binary cross-entropy was used as the loss function. The training data was massaged to fix imbalanced classes. Transfer learning was also performed using data from the real-world system to acquire the models for the real system. Based on the results, the precision for all the models reduces when performing transfer learning, except for the model trained two estimate ≥2 objects. This phenomenon can be attributed to noise within the real-world system data as well as limited availability real-world system data. This approach to training is in accordance with aspects of the disclosure.

For transferring objects between the bins, two approaches were evaluated: the naïve transfer approach and the proposed Markov-decision-process-based multiple object grasping and transferring approach. For Markov-decision-process-based multiple object grasping and transferring, data was collected to compute the state transition probability for each pre-grasp, and the problem was defined as a Markov decision process to acquire an optimum policy. For the experiments on both approaches, the best expectation pre-grasp was used as the pre-grasp to grasp the maximum quantity of objects and the clustered probability-based pre-grasp was used for grasping the target quantity of objects. The results for the experiments are shown in the table of FIG. 10.

Based on the results, when using a stochastic flexing routine with the pre-grasp in the real-world system, Markov-decision-process-based multiple object grasping and transferring reduced the number of transfers by 6.38% and the number of lifts by 9.26% when compared to the naïve approach. Similar results were observed when comparing the two transfer approaches using the grasping routine with the model and the finger flexion synergy. These results showcase the superiority of the Markov-decision-process-based multiple object grasping and transferring approach when compared to the naïve approach.

Similarly, when comparing the Markov-decision-process-based multiple object grasping and transferring results between the stochastic flexing routine with the pre-grasp and the grasping routine using the pre-grasps, finger flexion synergy, and the models, the routine with models outperformed the stochastic flexing routine by 6.81% in the number of transfers and 14.28% in the number of lifts in the real system. Similar results were observed in simulations as well, thereby showcasing the improvements made because of the models and the finger flexion synergy.

New multiple object grasping techniques presented herein include clustered-probability-based pre-grasp, best expectation pre-grasp, maximum capability pre-grasp, and a data-driven deep learning model to predict the quantity of objects in a grasp after the hand lifts, when the hand is in the pile. The two multi-object transferring approaches described are the naïve transfer approach and the Markov-decision-process-based multiple object grasping and transferring approach. Experimental results demonstrate that the Markov-decision-process-based multiple object grasping and transferring approach performs better than the naïve transfer approach, or a single object transferring approach.

Figure 18A:
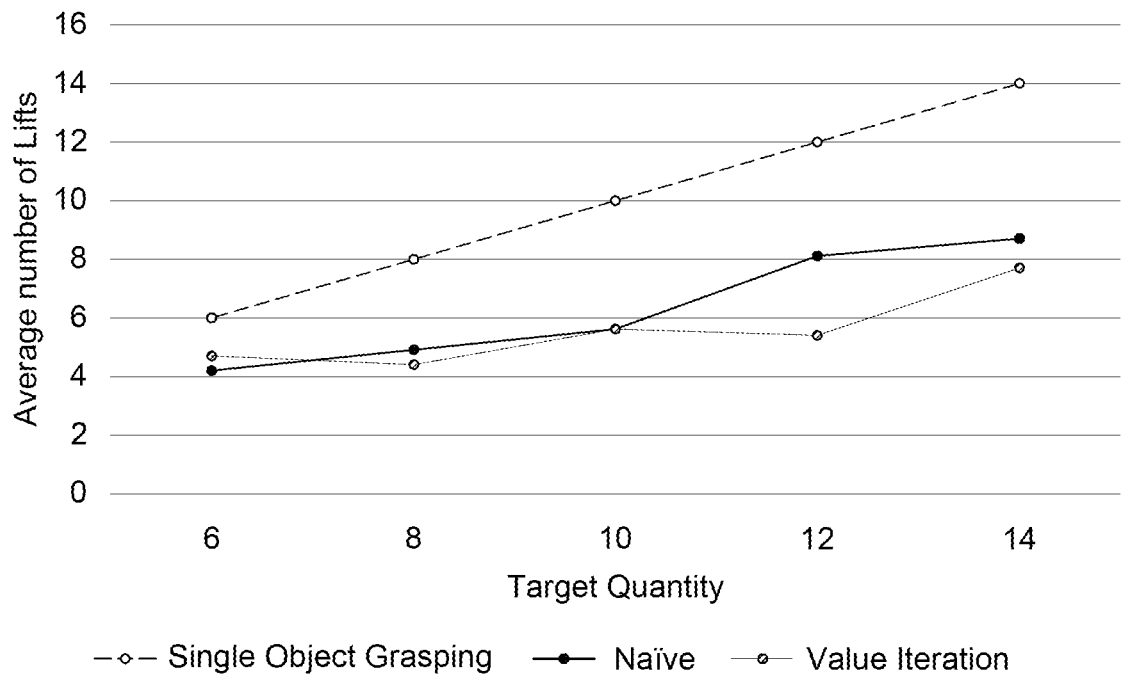
FIGS. 18A-18B are graphs illustrating lift and transfer data associated with multiple object grasping using robotics, according to some aspects of the disclosure.
Figure 18B:
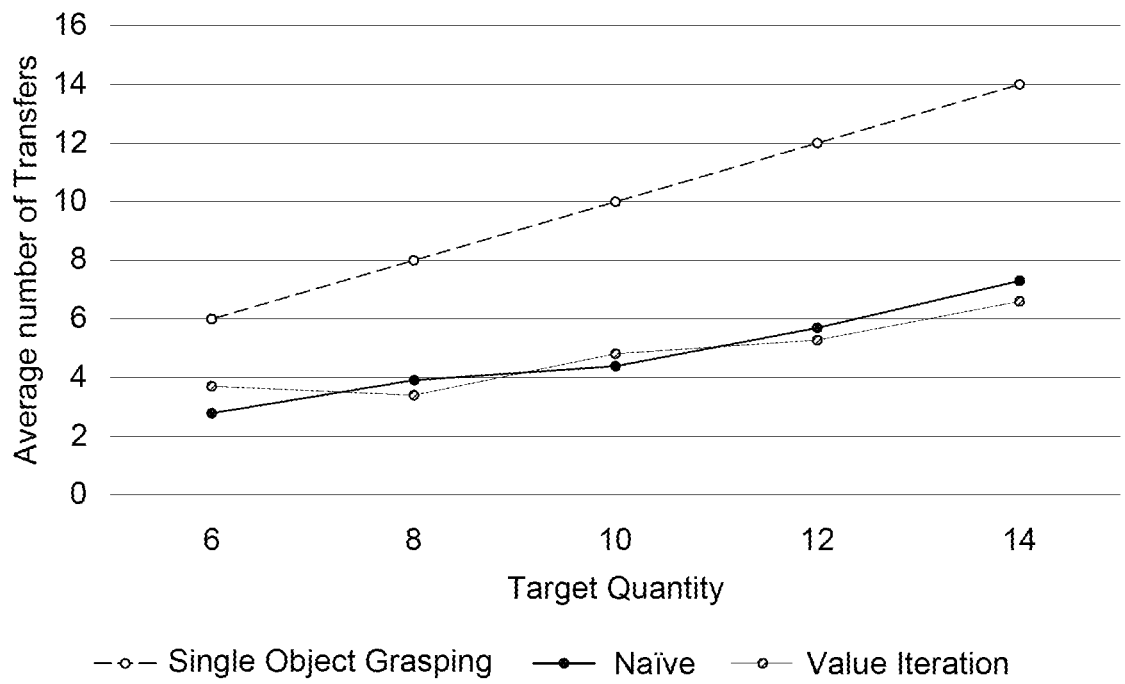

The virtual and real-world system setups shown in FIG. 7A and FIG. 7B were also used to evaluate different algorithms for solving a simple Markov-decision-process. The different algorithms include a value iteration (model-based) technique, a Q-learning (model free) technique, an actor-critic (model-free) technique, and a naïve technique. Each of these techniques were tested on different target quantities of objects. FIG. 18A is a graph illustrating the average number of lifts associated with these different techniques for different target quantities of objects. FIG. 18B is a graph illustrating the average number of transfers associated with these different techniques for different target quantities of objects.

As shown, the value iteration technique generally performs better than the naïve technique, however the naïve technique does perform a bit better when the target quantity is lower. Both the value iteration technique and the naïve technique perform better than single object grasping in this example.

The different transfer approaches were tested in the real-world system in addition to the virtual simulation, and the associated lift and transfer data is shown in the table of FIG. 11. For the real-world system experiments, the value iteration policy reduced the number of transfers by about 2.38%. In the virtual simulation, the Q-learning and the actor-critic techniques performed similarly to the value iteration technique. The combination of the model grasping routine and the value iteration technique reduced the number of transfers by about 59% in the real-world system and about 52% in the virtual simulation when compared to a prefect single object grasping approach.

In the real world, similarly shaped objects can still have irregularities in dimensions. Accordingly, the naïve technique, the value iteration technique, the Q-learning technique, and the actor-critic technique were tested on a pile of spheres with diameters ranging from 38-millimeters to 42-millimeters. The results are shown in the table of FIG. 12. The results demonstrate that the approaches described herein are still effective when there is a small irregularity among the objects.

The virtual and real-world system setups shown in FIG. 7A and FIG. 7B were also used to evaluate the grasping algorithms described herein for different types of objects. In these experiments, pre-grasps were chosen based on success rate, as defined by the equation $$SR(\theta) = \frac{N_{target}}{N_{total}},$$

where θ is the joint angle vector for the robotic hand, $N_{target}$ is the number of trails that the target number of objects are grasped, and $N_{total}$ is the total number of grasp trials performed from the same pre-grasp angle θ. For 40-millimeter diameter spheres, each of a set of 9,000 pre-grasps were repeated 10 times, and the pre-grasps that had a success rate higher than 60% and 30% for grasping 2 and 3 of the 40-millimeter diameter spheres, respectively, were chosen. 35 pre-grasps each (70 pre-grasps in total) for grasping 2 and 3 40-millimeter spheres were chosen. For 50-millimeter spheres, 1,000 pre-grasps were selected and repeated 10 times, and the pre-grasps that had a success rate higher than 40% and 20% for grasping 2 and 3 50-millimeter spheres, respectively, were chosen. 26 pre-grasps for grasping 2 50-millimeter spheres and 4 pre-grasps for grasping 3 50-millimeter spheres, in total, were chosen.

For each pre-grasp that was chosen, 100 trials were executed, and the pre-grasps were further narrowed down to 4 pre-grasps having the highest success rate of grasping 2 and 3 40-millimeter and 50-millimeter spheres. For each of the 4 pre-grasps, all the end poses for successful trials were gathered, and k-means clustering was performed to get the centers. The value of k was chosen as 3 to make sure the center with the largest number of neighbors represented most of the trials.

Data was also collected in the real-world system using ping-pong balls with a diameter of 40-millimeters. Instead of directly using the best pre-grasps selected from the simulation of 40-millimeter spheres, because there are differences in the simulation environment and the real system, the best 5 pre-grasps for each target number from the pre-grasps selected for the 40-millimeter spheres in simulation were selected, then the pre-grasps are used to collect 50 trials of grasping in the real-world system for each of the chosen pre-grasps. The two pre-grasps that gave the highest success rate of grasping 2 and 3 ping-pong balls, respectively, were chosen.

For this experiment, a total of 6 prediction models were trained: 3 models for the 40-millimeter sphere and 3 models for the 50-millimeter sphere. The precision of each of these models is shown for example in the table of FIG. 13. In the table of FIG. 13, precision represents the percentage of the correct predictions among all predictions of the class.

The stochastic grasping strategy was evaluated for grasping 2 and 3 spheres. Root mean squared error (RMSE) was used as the evaluation metric for the stochastic grasping strategy. The RMSE can be defined by the equation $$RMSE(\theta, \text{target}) = \frac{\sqrt{\sum_{n=1}^{N_{total}}(o_i - \text{target})^2}}{N_{total}},$$

where θ is the robotic hand's joint angle vector, $N_{total}$ is the total number of grasp trials performed from the same pre-grasp angle θ, target is the target number of objects to be grasped, and $o_i$ is the number of objects grasped in the $i_{th}$ trial. The strategy was conducted 10 times with computation of the RMSE. The results are shown for example in the table of FIG. 14, under the stochastic grasping strategy column, where F/E represents flexing/extending. The table of FIG. 14 also highlights the difficulty of grasping multiple objects when comparing the before PPG and after PPG columns.

To simulate a real-world scenario where objects in a bin have similar but not exactly the same sizes, the diameter of the spheres in the virtual simulation were randomly changed between 38-millimeters and 42-millimeters. The pre-grasps selected from the 40-millimeter sphere were used to test the grasping algorithm for grasping 2 and 3 spheres, and these results are also shown in the table of FIG. 14. From the data shown, the stochastic grasping strategy was found to achieve an average RMSE of 0.287 for grasping 2 objects and an average RMSE of 0.526 for grasping 3 objects. The data shown indicated the stochastic grasping strategy is very robust especially for grasping 2 objects. In the table of FIG. 14, the column labeled averaged re-grasps shows the average number of re-grasps the robotic hand performed before lifting in the stochastic grasping strategy, whereas the column labelled averaged objects per grasp shows the average number of objects each grasp trial got using the stochastic grasping strategy. The results also indicate the stochastic grasping strategy can tackle slightly non-uniform sized objects.

The stochastic grasping strategy was also tested in the real-world system for grasping 2 and 3 ping-pong balls. The results from this testing are shown in the example table of FIG. 15. The stochastic grasping strategy was conducted 50 times for grasping 2 and 3 ping-pong balls. For grasping 2 ping-pong balls, the strategy achieved an RMSE of 0.265. For grasping 3 ping-pong balls, the strategy achieved an RMSE of 0.4.

Additionally, the sequential MOG strategy detailed above (e.g., the process 300, etc.) was tested in a simulation environment on grasping more than one object. The results are shown in the table of FIG. 16. In the experiments, the sequential MOG strategy was compared to a baseline method, which is an ideal single bin-picking strategy with a 100% success rate. The proposed sequential MOG strategy was tested on three types of objects, including a 40 mm sphere, a medium cylinder, and a plum (e.g., as shown in FIG. 7E).

A cost of grasping per unit (CGPU) metric is shown, which can be defined using the equation $$CGPU_{lift} = \frac{N_{lift}}{k}.$$

where k is the total number of grasping trials and $N_{lift}$ is the total number of full lifts (e.g., the hand lifting out from the pile of objects and returning back into the surrounding air) it takes. The CGPU of mini lifts and re-grasps can be defined following the same concepts using the equations $$CGPU_{mini} = \frac{N_{mini-lift}}{k} \text{ and } CGPU_{re-grasp} = \frac{N_{re-grasp}}{k}.$$

Figure 19A:
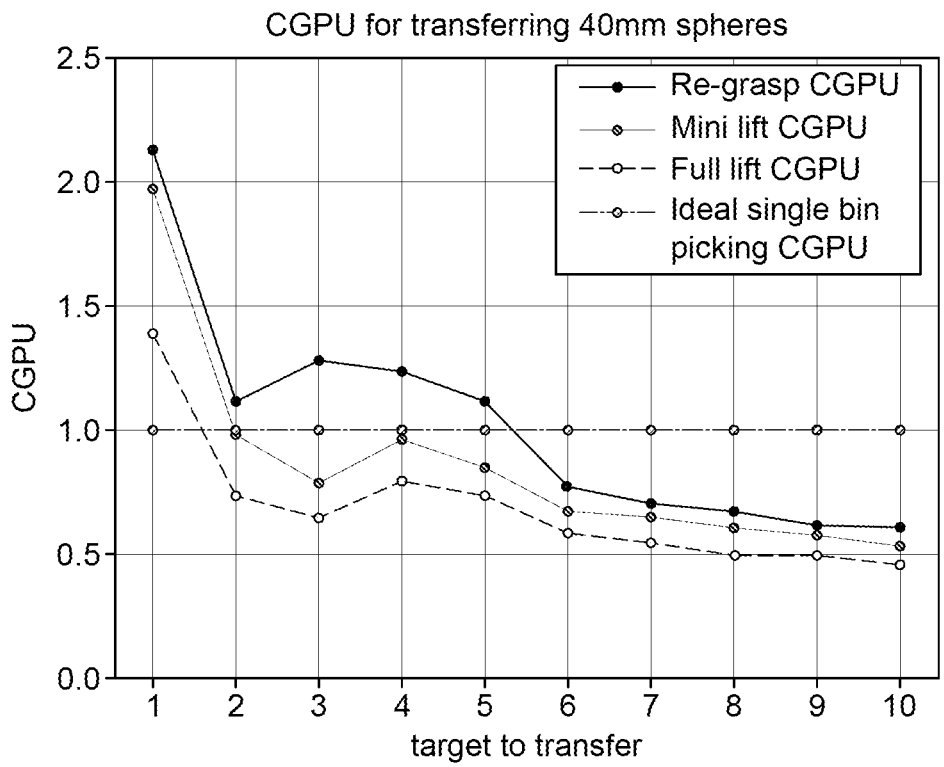
FIGS. 19A-19B are graphs illustrating cost of grasping per unit metrics associated with different functionality that can be implemented using the control system of FIG. 1, according to some aspects of the disclosure.
Figure 19B:
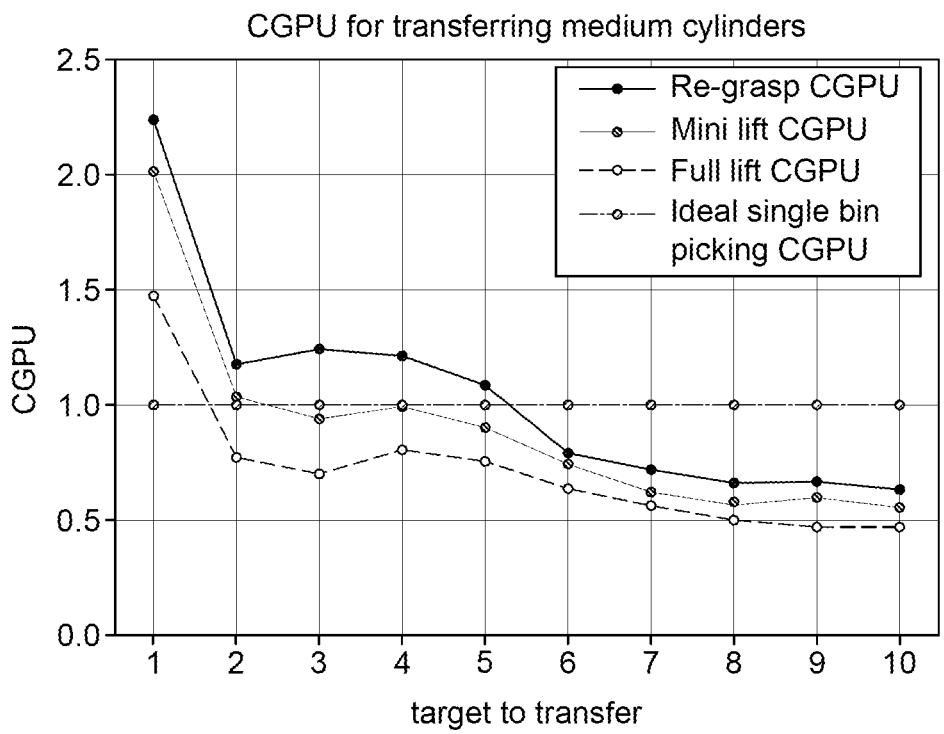

A plot showing the CGPU metrics for the 40 mm sphere is shown in FIG. 19A, and a plot showing the CGPU metrics for the medium cylinder is shown in FIG. 19B.

The table shown in FIG. 17 illustrates results of different components of the MOG strategies discussed herein. Specifically, metrics for (i) using a convolutional neural network (CNN) (e.g., model 600), (ii) using a convolutional neural network and an added mini lift step, (iii) using a transformer-based model (e.g., model 620) and an added mini lift step, and (iv) using a transformer-based model, an added mini lift step, and an experience tree (ET) (e.g., experience tree 640) are shown. From the data, it can be seen that using the transformer-based model as opposed to the CNN (e.g., using model 620 as opposed to model 600) as well as using an added mini lift step and using an experience tree for the synergy overall performs better than the other strategies. During experimentation, it was also found that using the vision-based deep learning approaches described herein (e.g., using the approach illustrated in FIG. 6G) to count the number of objects in hand 135 when hand 135 is in the air (e.g., as hand 135 is moving between bin 210 and bin 220) improved prediction accuracy.

Figure 20:
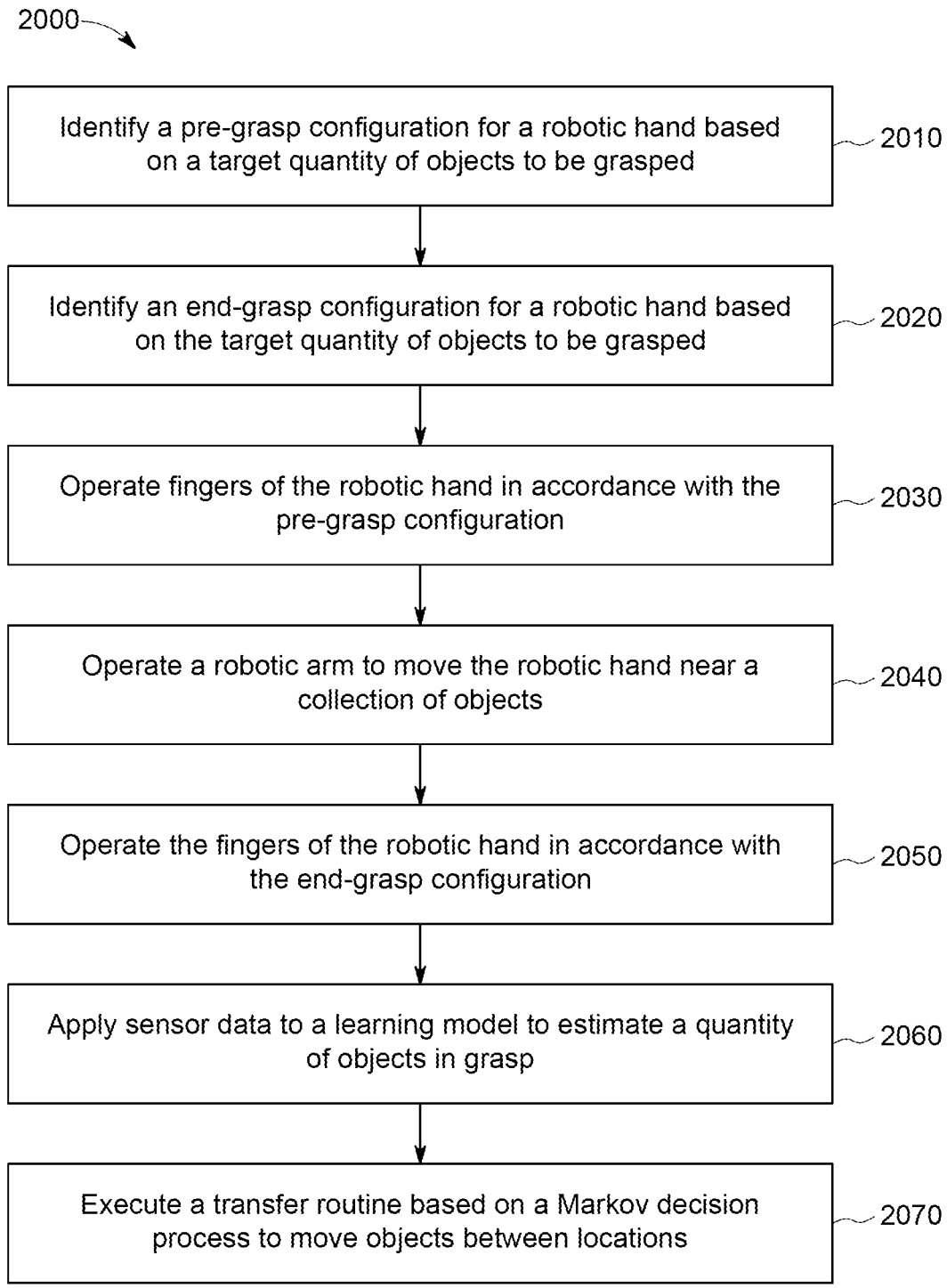
FIG. 20 is a flowchart illustrating an example process for grasping and transferring multiple objects between locations using robotics, according to some aspects of the disclosure.

Referring to FIG. 20, a flowchart illustrating an example process 2000 for grasping and transferring multiple objects between locations using robotics is shown, according to some aspects of the disclosure. Process 2000 can be performed by robotic system 130 as part of control system 100, for example. Process 2000 generally involves grasping of multiple objects using a robotic hand and executing a transfer routine based on a Markov decision process to transfer object between locations. Process 2000 can generally provide improved efficiency in terms of number of lifts and transfers performed by a robot, and thereby time needed to complete a process of transferring objects between locations. Process 2000 can include using process 500 and/or model 600 as described above.

Process 2000 is shown to include identifying a pre-grasp configuration for a robotic hand based on a target quantity of objects to be grasped (2010). For example, approaches to identifying a pre-grasp configuration such as the best-expectation pre-grasp and the maximum capability pre-grasp as described above can be used. Moreover, calculations such as potential pre-grasp values, clustered probability-based pre-grasps, and average grasp potentials as described above can be used to identify a pre-grasp configuration. The pre-grasp configuration can be defined by a variety of variables associated with hand 135 such as spread angles for one or more of fingers, an orientation of the palm of hand 135 (e.g., angles, directions, etc.), and other controllable variables. A stochastic flexing routine can also be used as described above to identify an appropriate pre-grasp configuration. The target quantity of objects can vary depending on the type of robot used, the type of objects being grasped, and various other factors depending on the intended application.

Process 2000 is also shown to include identifying an end-grasp configuration for a robotic hand based on the target quantity of objects to be grasped (2020). There can be several distinct end-grasp types associated with the quantity of objects in hand 135 that can be discovered for a single pre-grasp. The end-grasp can also be defined by a variety of variables associated with hand 135 such as spread angles for one or more of fingers, an orientation of the palm of hand 135 (e.g., angles, directions, etc.), and other controllable variables. Different end-grasps can be compared based on expected success rates and K-means clustering (among other approaches to selecting an end-grasp) as described above. The end-grasp configuration is intended to grasp the target quantity of objects.

Process 2000 is also shown to include operating fingers of the robotic hand in accordance with the pre-grasp configuration (2030). For example, processor 131 can be programmed to control operation of hand 135 such that the fingers of hand 135 are oriented in accordance with the identified pre-grasp configuration. The pre-grasp configuration is intended for grasping the target quantity of objects with a high probability of success. Once hand 135 is oriented in accordance with the pre-grasp configuration, hand 135 is ready to grasp multiple objects as part of the transfer process.

Process 2000 is also shown to include operating a robotic arm to move the robotic hand near a collection of objects (2040). For example, processor 131 can be programmed to control operation of arm 134 such that arm 134 pivots to move hand 135 near the collection of objects. Referring to the example setup in system 200, arm 134 can be operated to move hand 135 near bin 210 to grasp a target quantity of tomatoes. Hand 135 can be oriented in accordance with the pre-grasp configuration as it is moved towards the collection of objects by arm 134.

Process 2000 is also shown to include operating the fingers of the robotic hand in accordance with the end-grasp configuration (2050). For example, processor 131 can be programmed to control operation of hand 135 such that the fingers of hand 135 are oriented in accordance with the identified end-grasp configuration. By operating hand 135 in this manner, robotic system 130 will effectively attempt to grasp objects, such as a number of tomatoes in bin 210 of example system 200. There is not a guarantee that hand 135 will grasp the target quantity of object by operating the fingers of hand 135, so it is important to have a way to estimate the number of objects that are actually grasped by hand 135 after it is operated in accordance with the end-grasp configuration.

Process 2000 is also shown to include applying sensor data to a learning model to estimate a quantity of objects in the grasp of the robotic hand (2060). For example, processor 131 can receive data form tactile sensors and other sensors positioned within and/or around hand 135 and arm 134, including the fingers and palm of hand 135. Processor 131 can also receive other data associated with robotic system 130 such as torque data associated with arm 134 and its rotation about various joints, for example. This data can be applied to a learning model such as the example models described above in order to estimate the quantity of objects that are actually in the grasp of hand 135 at a given time. More than one leaning model may be used for various different applications to improve accuracy. Various approaches to training the learning model can be implemented, such as described above. The use of a dynamic learning model such as described above with artificial intelligence capabilities can provide accurate estimations to facilitate smooth operation of the transfer process performed by robotic system 130. The learning model and associated training data can be stored in memory 132 and/or memory 152, for example.

Process 2000 is also shown to include executing a transfer routine based on a Markov decision process to move objects between locations (2070). For example, processor 131 can be programmed to execute example Markov decision process 300 as described above in order to carry out the transfer process. The transfer process can include transferring all ten tomatoes placed in bin 210 to bin 220 in example system 200, for example. The ability of robotic system 130 to grasp multiple objects while completing the transfer process, while using such a Markov decision process model as described herein can provide improved efficiency for the overall transfer process. Robotic system 130 can move the objects from a first location to a second location, where the locations can be any kind of suitable location. Bin 210 and bin 220 are provided as examples, however robotic system can also move objects from one conveyer to another conveyer, from a bin or box to a conveyer, from a conveyer to a bin or a box, between various types of containers, and the like. It will be appreciated that the transfer routine executed at 2070 may not necessarily be based on a Markov decision process. The transfer routine executed at 2070 can be based on any of the techniques described herein, and various combinations thereof.

Some portions of the preceding detailed descriptions have been presented in terms of algorithms and symbolic representations of operations on data bits within a computer memory. These algorithmic descriptions and representations are the ways used by those skilled in the data processing arts to effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "modifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium (including non-transitory computer readable storage mediums), such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the technique. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (such as a computer). For example, a machine-readable (such as computer-readable) medium includes a machine (such as a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. The detailed description set forth above, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The invention claimed is:

1. A system, comprising:
a robotic hand comprising a base and fingers, the robotic hand capable of grasping objects; a robotic arm coupled to the robotic hand and capable of moving the robotic hand;
one or more circuits for operating the robotic hand and the robotic arm, the one or more circuits configured to:
identify a pre-grasp configuration for the robotic hand based on a target quantity of objects to be grasped by the robotic hand;
operate the fingers of the robotic hand m accordance with the pre-grasp configuration; and
execute a transfer routine based on a Markov decision process to operate the robotic arm and the robotic hand such that the robotic hand grasps the target quantity of objects in a first location and the robotic hand and the robotic arm transfer the target quantity of objects to a second location, wherein numbers of objects in the second location are modeled as states in the Markov decision process.

2. The system of claim 1, wherein the target quantity is greater than one of the objects.

3. The system of claim 1, wherein the one or more circuits are configured to identify the pre-grasp configuration for the robotic hand based on a spread angle associated with at least one of the fingers of the robotic hand.

4. The system of claim 3, wherein the one or more circuits are configured to identify the pre-grasp configuration for the robotic hand based on a probability of successfully grasping the target quantity of objects associated with the spread angle.

5. The system of claim 1, wherein the one or more circuits are configured to identify the pre-grasp configuration for the robotic hand based on a weighted sum of probabilities associated with different quantities of objects capable of being grasped by the robotic hand.

6. The system of claim 1, wherein the one or more circuits are configured to identify the pre-grasp configuration for the robotic hand based on a volume associated with the pre-grasp configuration.

7. The system of claim 1, wherein the Markov decision process models grasping, lifting, and transferring as performed by the robotic hand and the robotic arm as actions within the Markov decision process.

8. A method, comprising:
identifying a pre-grasp configuration for a robotic hand comprising fingers based on a target quantity of objects to be grasped by the robotic hand;
operating the fingers of the robotic hand in accordance with a spread angle of one or more of the fingers of the robotic hand associated with the pre-grasp configuration; and
executing a transfer routine based on a Markov decision process to operate a robotic arm coupled to the robotic hand such that the robotic hand grasps the target quantity of objects in a first location and transfers the target quantity of objects to a second location, wherein numbers of objects in the second location are modeled as states in the Markov decision process.

9. The method of claim 8, wherein identifying the pre-grasp configuration for the robotic hand comprises identifying the pre-grasp configuration based on a probability of successfully grasping the target quantity of objects associated with the spread angle.

10. The method of claim 8, wherein identifying the pre-grasp configuration for the robotic hand comprises identifying the pre-grasp configuration based on a weighted sum of probabilities associated with different quantities of objects capable of being grasped by the robotic hand.

11. The method of claim 8, wherein identifying the pre-grasp configuration for the robotic hand comprises identifying the pre-grasp configuration based on a volume associated with the pre-grasp configuration.

12. The method of claim 9, wherein executing the transfer routine based on the Markov decision process comprises executing the transfer routine based on the Markov decision process wherein the Markov decision process models different grasping actions performed by the robotic hand as actions within the Markov decision process.

13. The method of claim 8, further comprising:
identifying an end-grasp configuration for the robotic hand based on the target quantity of objects to be grasped by the robotic hand; and
operating the fingers of the robotic hand in accordance with the end-grasp configuration to perform a grasping action using the robotic hand.

14. A method, comprising:
identifying a pre-grasp configuration for a robotic hand comprising fingers based on a target quantity of objects of a collection of objects to be grasped by the robotic hand;
identifying an end-grasp configuration for the robotic hand based on the target quantity of objects to be grasped by the robotic hand;
operating the fingers of the robotic hand in accordance with the pre-grasp configuration; operating a robotic arm coupled to the robotic hand to move the robotic hand near the collection of objects;
operating the fingers of the robotic hand in accordance with the end-grasp configuration such that the robotic hand grasps the target quantity of objects; and
executing a transfer routine based on a Markov decision process to operate the robotic arm and the robotic hand such that the robotic arm and the robotic hand transfer the target quantity of objects from a first location to a second location, wherein numbers of objects in the second location are modeled as states in the Markov decision process.

15. The method of claim 14, wherein identifying the pre-grasp configuration for the robotic hand comprises identifying the pre-grasp configuration based on a spread angle associated with at least one of the fingers of the robotic hand.

16. The method of claim 15, wherein identifying the pre-grasp configuration for the robotic hand comprises identifying the pre-grasp configuration based on a probability of successfully grasping the target quantity of objects associated with the spread angle.

17. The method of claim 14, wherein identifying the pre-grasp configuration for the robotic hand comprises identifying the pre-grasp configuration based on a volume associated with the pre-grasp configuration.

\* \* \* \* \*